(12) United States Patent
Boodram

(10) Patent No.: US 9,947,122 B2
(45) Date of Patent: Apr. 17, 2018

(54) PHOTO FAMILY TREE BUILDER

(71) Applicant: Alma Jean Boodram, Hudson, FL (US)

(72) Inventor: Alma Jean Boodram, Hudson, FL (US)

( * ) Notice: Subject to any disclaimer, the term of this patent is extended or adjusted under 35 U.S.C. 154(b) by 0 days.

(21) Appl. No.: 15/354,698

(22) Filed: Nov. 17, 2016

(65) Prior Publication Data

US 2017/0213372 A1 Jul. 27, 2017

Related U.S. Application Data

(60) Provisional application No. 62/259,211, filed on Nov. 24, 2015.

(51) Int. Cl.
| | | |
|---|---|---|
| *G06F 17/24* | (2006.01) | |
| *G06T 11/60* | (2006.01) | |
| *H04N 1/00* | (2006.01) | |

(52) U.S. Cl.
CPC ............ *G06T 11/60* (2013.01); *G06F 17/241* (2013.01); *G06F 17/248* (2013.01); *H04N 1/00145* (2013.01); *H04N 1/00167* (2013.01); *H04N 1/00188* (2013.01); *H04N 1/00196* (2013.01)

(58) Field of Classification Search
CPC ....................................................... G06F 17/24
USPC ......................................................... 700/244
See application file for complete search history.

(56) References Cited

U.S. PATENT DOCUMENTS

| | | | | |
|---|---|---|---|---|
| 2003/0014422 A1* | 1/2003 | Notargiacomo | .. | G06F 17/30861 |
| 2006/0287876 A1* | 12/2006 | Jedlicka | ................ | G06Q 10/10 345/441 |
| 2013/0265334 A1* | 10/2013 | Brookhart | ........... | G06F 3/04812 345/672 |

\* cited by examiner

*Primary Examiner* — Kavita Padmanabhan
*Assistant Examiner* — Tionna Burke
(74) *Attorney, Agent, or Firm* — Terry M. Sanks, Esq.; Lisa D. Velez; Beusse Wolter Sanks & Maire, PLLC

(57) ABSTRACT

The photo family tree builder is a business process and a computerized method for creating a two-dimensional family tree product using software. The software allows users to organizes photos of related individuals, or couples in a family tree, according to actual family relationships. It provides cooperating templates consisting of: one or more seeds, a tree trunk with a crown: one or more branches and picture frames of leaves, hearts, love-knots, fruits or flowers of the tree, which helps the display, emulate a natural tree. The tree is expandable and capable of displaying any number of generations. It provides a way to use photos that are readily available of family members; without requiring new ones and it provides an inconspicuous and clear alternative for missing pictures. It accommodates the growth of families, through marriages, unions and births. Lastly, the picture frames and indicia tags contain a place for names and dates.

18 Claims, 24 Drawing Sheets

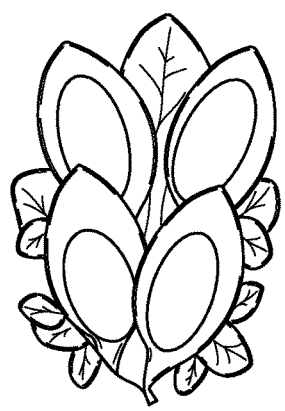
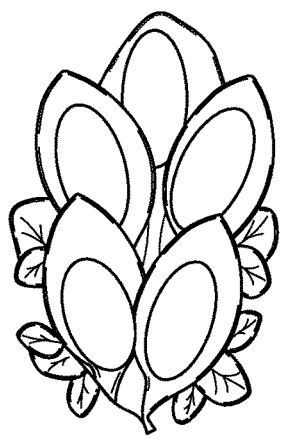
FIG. 2J  FIG. 2K  FIG. 2L
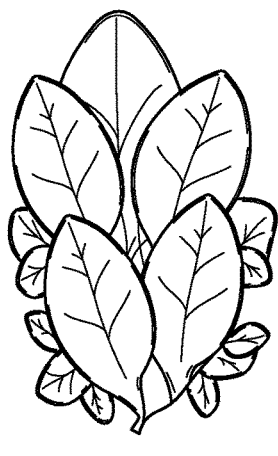
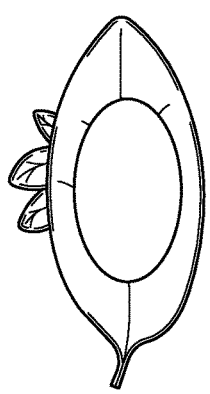
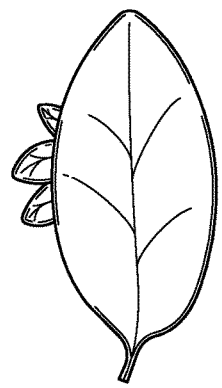
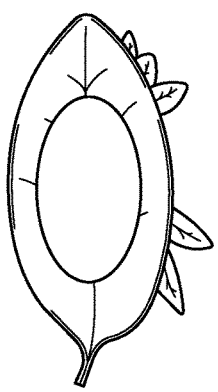
FIG. 2M  FIG. 2N  FIG. 2O  FIG. 2P
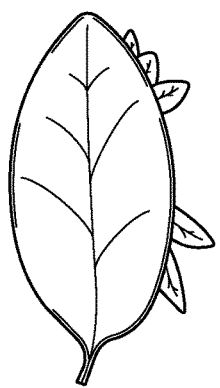
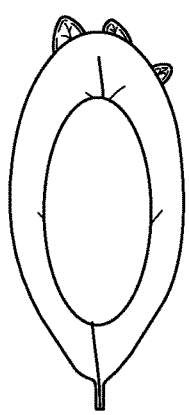
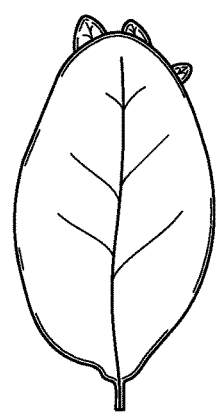
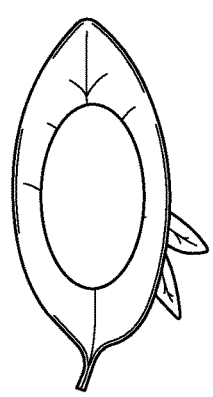
FIG. 2Q  FIG. 2R  FIG. 2S  FIG. 2T

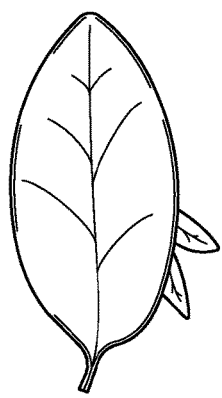
FIG. 2U
FIG. 3
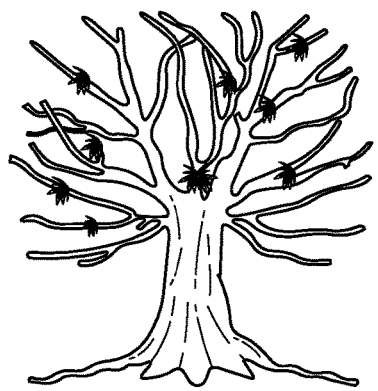
FIG. 4
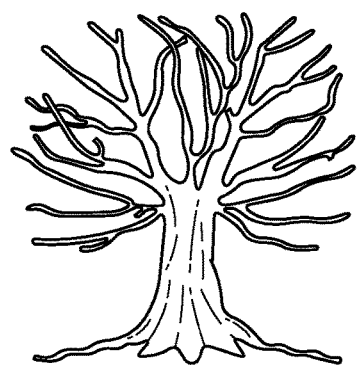
FIG. 5
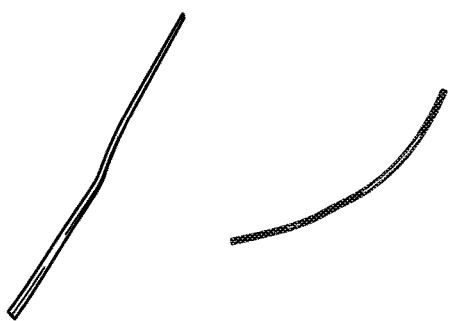
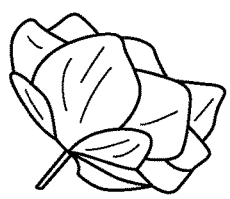
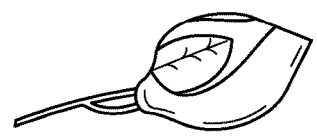
FIG.6　　FIG. 7　　FIG. 7A　　FIG. 7B

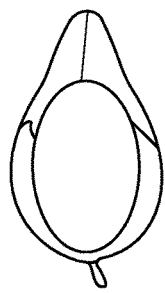  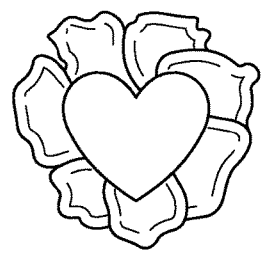 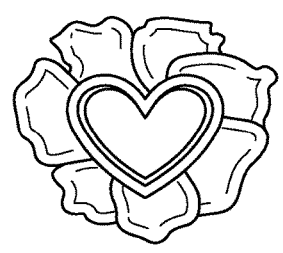
FIG. 7C    FIG. 7D    FIG. 8    FIG. 8A
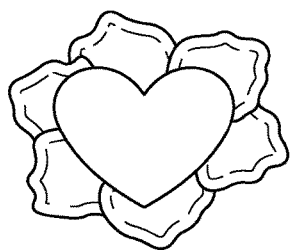 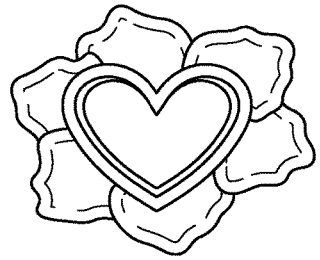 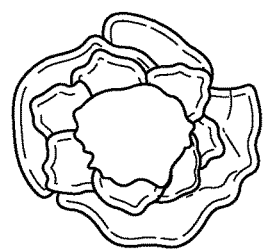
FIG. 9    FIG. 9A    FIG. 10
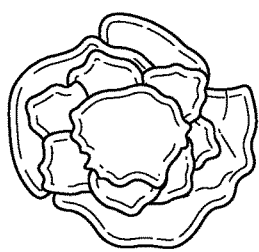 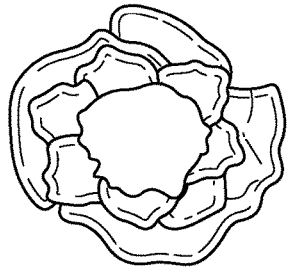 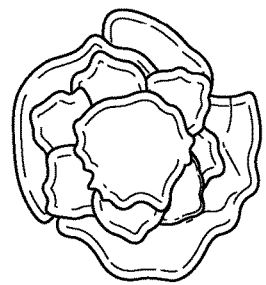
FIG. 10A    FIG. 10B    FIG. 10C

PHOTO FAMILY TREE BUILDER

CROSS-REFERENCE TO RELATED APPLICATION

This application claims the benefit of U.S. Provisional Application No. 62/259,211 filed Nov. 24, 2015, the disclosure of which is incorporated herein by reference.

BACKGROUND OF THE INVENTION

1. Field of Invention

This invention is a method and system that generally relates to decorative and educational displays; specifically, to modular genealogical or family tree displays having frames for photographs or other-likeness of family members.

2. Related Art

Many people compile genealogical information to record and understand their roots. Parents often teach children this information to help them understand their family identity. Children know living family members by their relationships. It takes time for young children and others to develop a clear mental picture of the relationships of many relatives. Education is one reason, so many devices, aids, and methods have been invented for recording, teaching and displaying information to understand genealogy or family relationships, as well as, knowing their roots and having a sense of belonging.

Genealogical Charts show and identify ancestors or descendants by name and other data in a structure that shows their family relationships. Such charts are useful for research and record keeping. Examples are U.S. Pat. No. 1,297,663 to Davis, and U.S. Pat. No. 4,483,680 to Daly, U.S. Pat. No. 4,501,559 to Griswald et al., and common pedigree charts.

Plaques having printed or engraved names are useful for displaying genealogical or family tree information, as seen in U.S. Pat. No. Des. 265,643 to Smith and U.S. Pat. No. Des. 427,938 to Berg, a Family Tree Name Plaque. Some multiple photograph picture frames have a family tree theme. U.S. Pat. No. 4,794,716 to George et al. a school bus Display Mount Device; viewed photographs of a child taken sequentially through the years. Sometimes this theme is expressed in the name only, such as "Family Tree Picture Holder," U.S. Pat. No. Des. 285,751 to Timarac. Sometimes it is expressed by the presence of an ornamental tree, such as in "Picture Frame," U.S. Pat. No. Des. 270,882 to Wilson. Neither of these shows the relationships of the family members.

Some related genealogy displays are family tree games. U.S. Pat. Nos. 4,375,288, Des. 276,055 and Des. 273,312, all to Guertin, are directed to a game that teaches genealogical research methods while players place likenesses of persons on an ornamental tree. Some games are intended to familiarize children with older members of their families. U.S. Pat. No. 3,970,313 to Montemayor, an Ancestry Educational Game Apparatus.

Some genealogical displays are modular. In U.S. Pat. No. 705,833 to Gee, record elements bearing names are loosely linked to create a Genealogical Chain Record. U.S. Pat. No. 4,650,422 to Gorezynski shows a family tree doll set in which dolls representing various generations of a family occupy tree swings or tree houses in a tree. U.S. Pat. No. 4,865,548 to Snyder teaches a three-dimensional display capable of showing or representing lateral family relationships such as aunts, uncles, and cousins using markers bearing names. French Pat. No. 1,195,038 shows a modular construction in which vertical members represent the males of a family and oblique members represent the females. Gee and the French patent suggest that pictures can accompany the modular elements. A "Heritage Tree" having modular apple-shaped picture frames was advertised as the "Perfect for the family tree." Also, U.S. Pat. No. 5,246,374 to Alma Boodram, A kit, a three-dimensional display structure, and method for displaying photos of related individuals and couples in a family Tree, the "Expandable Family Tree and Modular Kit for Building the Same" and U.S. Pat. No. 6,524,108 to Murray, another Three dimensional family tree. U.S. Pat. No. 6,554,490 to Avila is a Picture Plant Assembly for providing an ornamental and attractive method for displaying photograhs and U.S. DES. 667,227 to Altieri is a Multi-Generation Family Tree Quilt Appique.

U.S. Pat Application of Wong et. al, A Method and System Constructing Dynamic and Interactive Family Trees based upon an Online Social Network. Users access web site of an online social network and interactively contribute information to the family tree. U.S. Pat. Application to Peters, "Electronic Family Tree Generator and Display System;" an interactive electronic picture organization and display system stores pictures.

Then there are computer programs that creates a method and system for making a product like U.S. Pat. No. 5,842,218 to Robinson, "A method computer program product and system for a reorienting categorization table;" Also U.S. Pat. No. 7,957,907 to Sorenson et. al is another example of a computer Method for Molecular Genealogical Research; which is a genetic genealogical research and record keeping system and method for identifying family ties between siblings, patents and children ancestors and progeny across many generations. U.S. Pat. No. 8,224,862 to Sacks; a System and Method Providing a Networked Viral Family Tree; a computer implemented method of dealing with profile email relationships to generate a family tree. U.S. Pat. Nos. 8,095,567 and 8,768,970 are directed to Providing Alternatives within a Family Tree Systems and Methods; a method of creating a family tree requests. U.S. Pat. No. 8,719,304 to Golze: A Systems, Methods, and Graphical Tools for Representing Connectedness of Individuals, connecting relationships between individuals by nodes and strands. Last but not least is U.S. Pat. No. 8,769,438 to Mangum et. al who invented Methods and System for Displaying Pedigree Charts on a touch device. It is an air fan turbine positioned close to the exhaust fan system of an air handier system As seen from the genealogical inventions above there is considerable interest in providing ways of recording, teaching, displaying genealogical information to preserve and strengthen family bonds, as well as providing systems and methods using computer software. However, whatever the decisive advantages or attributes of the mentioned genealogical and family tree displays, none of them achieves or fulfills the purposes of the present invention as defined by the following objectives, disclosure, and claims.

OBJECTS AND SUMMARY OF THE INVENTION

1. Objects

The Photo Family Tree Builder fulfills several objectives. The software is a new principle of operation. It is a tool that permits a user to build a family tree artifact; that is expandable, flexible, educational, attractive and suitable for hanging.

The first object of the software is to allow consumers to build a personalized photo family tree product via a computer program software and to provide a method of delivering the service through Internet browsers or a desktop app. A consumer comes to a website and makes a purchase of a small, medium or large Photo Family Tree. He or she; then, has access to the Photo Family Tree Builder software which is delivered within the website browser, or the software can be downloaded onto their user's local PC if a desktop app. Whether software is a browser application or desktop application, or a combination of both; a user gains access to the software after the registration, signing into their account on the website or the download.

The second object of the current invention is to provide a basic tree trunk and accompanying picture frames capable of displaying family relationships according to a particular family's genealogy or family tree. The tree software is resilient or flexible enough to accommodate the growth of the family through marriages, unions, and various kinds of births. The graphical display show relationships involving children of a single parent, and display accommodates growth of the family and any number of generations.

The third object of the current invention is to make significant improvements over the construction of U.S. Pat. No. 5,246,374, inventor Alma Boodram. "The Expandable Family Tree and Modular Kit for Building the Same," referred to from now on, as the Kit. The Photo Family Tree has made improvements to the Kit and the enhancements are as followers:

a. The Kit was described as a metal product; whereas, advantageously, the Photo Family Tree is computer generated printed poster product.

b. The construction process has been improved, for there is no assembly of metal mechanical parts and connectors as in the Kit invention. The Photo Family Tree is constructed with a computer application, and the output is made with ink, printed on paper or canvas. This improved construction process makes the Photo Family Tree more economical, faster and easy to make than the Kit.

c. Another benefit to the computer generated Photo Family Tree is, not only, is it more economical and efficient to build, but when framed, it becomes more durable and easier to hang than the Kit.

d. The Kit did not address leaf frames of a certain family relationship like a half sibling child, adopted child, twins, triplets, quadruplets, quintuplets, stepchild, blended family children (his child, her child, and our child); whereas The Photo Family Tree provide picture frames for all of these scenarios.

e. The Kit did not allow for showing images or an alternative representation the earliest ancestors on the paternal or maternal sides of the family. However, The Photo Family Tree does show them, in seed frames placed below the root of the tree; along with indicia tags to record names and important dates. Both indicia tages and seed framed are positioned below the root of the tree.

f. Additionally, the Kit did not provide a way for identification of each and every family member, however, the Photo Family Tree software does accommodate recording each family member names, dates birth and death, if the user desires to do so. The current invention offers text option for recording data.

g. The design of the Photo Family Tree's computer generated output is a poster printed in various sizes; for instance 16"×20", 18"×20", 20"×24" or 24×36.

h. The Kit was bound by one tree type design; however, the Photo Family Tree is not constricted by a particular tree type; the consumer can pick from an assortment of tree species for their family tree, for example, Magnolia, Cherry Blossom, Flowering Dogwood, Jacaranda, and Maple. This advantage makes Photo Family Tree more flexible, decorative and attractive than the Kit.

i. The Photo Family Tree is more commercially viable than the Kit; because it can be marketed to a larger audience. The Photo Family Tree software will be easy to use, responsive, and can be the viewed on multiple devices, PCs, laptops, tablets, and mobiles. Lastly, the Photo Family Tree can be created on a personal computer or tablet without much effort.

The fourth object of the invention to is to provide consumers with a way to use the photographs that are readily available and not require new ones. While the fifth object is to provide a structure that can accommodate and provide an inconspicuous and logical alternative to a missing or unavailable family members photograph, should it occasionally be necessary. If a photograph is not available, for an individual or a couple, a logical alternative is provided. The current invention meets the sixth and last object; when, the consumer uses this software to create a composition that retains the metaphor of a real tree, it can be deemed an educational family heirloom for future generations to enjoy.

2. Summary

The above objects and more are met by providing a genealogical display having the metaphor of a common tree, with several different enhancement and changes that enable the structure to reveal extended family relationships for any number of generations.

The program software provides object template pieces as a set of cooperating parts. The basic template object menu contains at least one heart-shaped picture frame (heart), an elongated member rough simulation of a branch of a tree (a branch), and several leaf picture frames (leaves). The branch placed behind the heart-shaped picture frame. The leaf picture frames each have a blade and a leafstalk. The blade portion holds a picture and the leaf stalk connects selectively along the length of the branch. These basic object templates are sufficient to display a nuclear family (father, mother, and their children) according to the invention.

According to the configuration of the invention, organized by generations, the hearts, and leaves, follow this fundamental principle. A heart represents marriage. The heart frame holds a picture of a married person alone or with his or her spouse. A branch placed behind to the heart extends or "grows" out of the heart, preferably near the top (focal facing point) of the heart. The children of this marriage are each represented by a leaf; growing from the branch in a phyllotaxy, which is an arrangement of leaves on a branch. The "branch" is any elongated member connecting various picture frames.

For a more elaborate display, additional pieces are required to develop it. For practicing the most advanced features of the invention, one needs to have at least one branch mounted on the back of one of the tree trunk crown leaves as if growing out of it. This second branch is not mounted on the leafstalk. The branch attached to the back of the leaf blade instead, as if grafted into the leaf. This feature of all the leaves provides for growth.

The main nuclear family display is extended as follows: If a child is married, a heart picture frame represents him or her and spouse; then placed on top of a new branch. The new branch extends beyond the upper part of the heart picture frame. If this marriage resulted in any children, another phyllotaxy of leaf frames about this new extension branch represents the children of the wedding. Thus, a new generation is created by repeating the nuclear family composition or portions of it where necessary. The nuclear family structures are attached to each other according to family relationships.

The first generation can be shown as the seeds below the root of the tree FIG. 1, and also provide a stronger metaphor of a tree. The second generation is connected to the trunk of the tree, by mounting a heart-shaped picture frame above the root of the trunk. Spread out like a fan; each third generation child leaf-frame attaches to a separate limb at the crown of the tree. Thus, the third generation is an exception to the phyllotaxy leaf arrangement about a branch. A heart or a love-knot represents each third generation parent. The third generation parent's heart or love-knot is mounted on an extension branch and is part of a nuclear family display. The love-knot picture frame is similar to the heart-shaped picture frame. It represents unmarried parents and may substitute for a heart-shaped picture frame wherever required.

BRIEF DESCRIPTION OF THE DRAWINGS

FIG. 2J demonstrates a quadruplet leaf picture frame.

FIG. 2K illustrates a quadruplet leaf non-picture frame

FIG. 2L shows a quintuplet leaf picture frame.

FIG. 2M illustrates a quintuplet leaf non-picture frame.

FIG. 2N demonstrates step child leaf picture frame

FIG. 2O shows the stepchild leaf non-picture frame.

FIG. 2P shows her child leaf picture frame.

FIG. 2Q illustrates her child leaf non-picture frame.

FIG. 2R illustrates our child leaf picture frame.

FIG. 2S demonstrates our child leaf non-picture frame

FIG. 2T shows his child leaf picture frame.

FIG. 2U shows his child leaf non-picture frame.

FIG. 3 shows an Indicia Tag.

FIG. 4 is a front view of the alternate tree trunk.

FIG. 5 is a front view of a tree trunk.

FIG. 6 is showing a branch example of long length, according to one embodiment of the invention.

FIG. 7 is showing a branch example of short length and curved, according to one embodiment of the invention.

FIG. 7A is a flower end cap,

FIG. 7B is a bud or seed end cap.

FIG. 7C is a seed picture frame,

FIG. 7D is a seed non-picture frame.

FIG. 8 is a junior heart-shaped picture frame provided, according to one embodiment of the invention.

FIG. 8A is a junior heart-shaped non-picture frame (a placeholder for missing photos of an actual person).

FIG. 9 is a senior heart-shaped picture frame, according to one embodiment of the invention.

FIG. 9A is a senior heart-shaped non-picture frame (a placeholder for missing photos of actual persons).

FIG. 10 is a junior love-knot picture frame.

FIG. 10A is a junior love-knot non-picture frame as provided, according to one embodiment of the invention.

FIG. 10B a senior love-knot picture frame

FIG. 10C is a senior non-picture frame as provided, (a placeholder for missing photos of actual persons).

DESCRIPTION OF THE PREFERRED EMBODIMENTS

Figure 1:
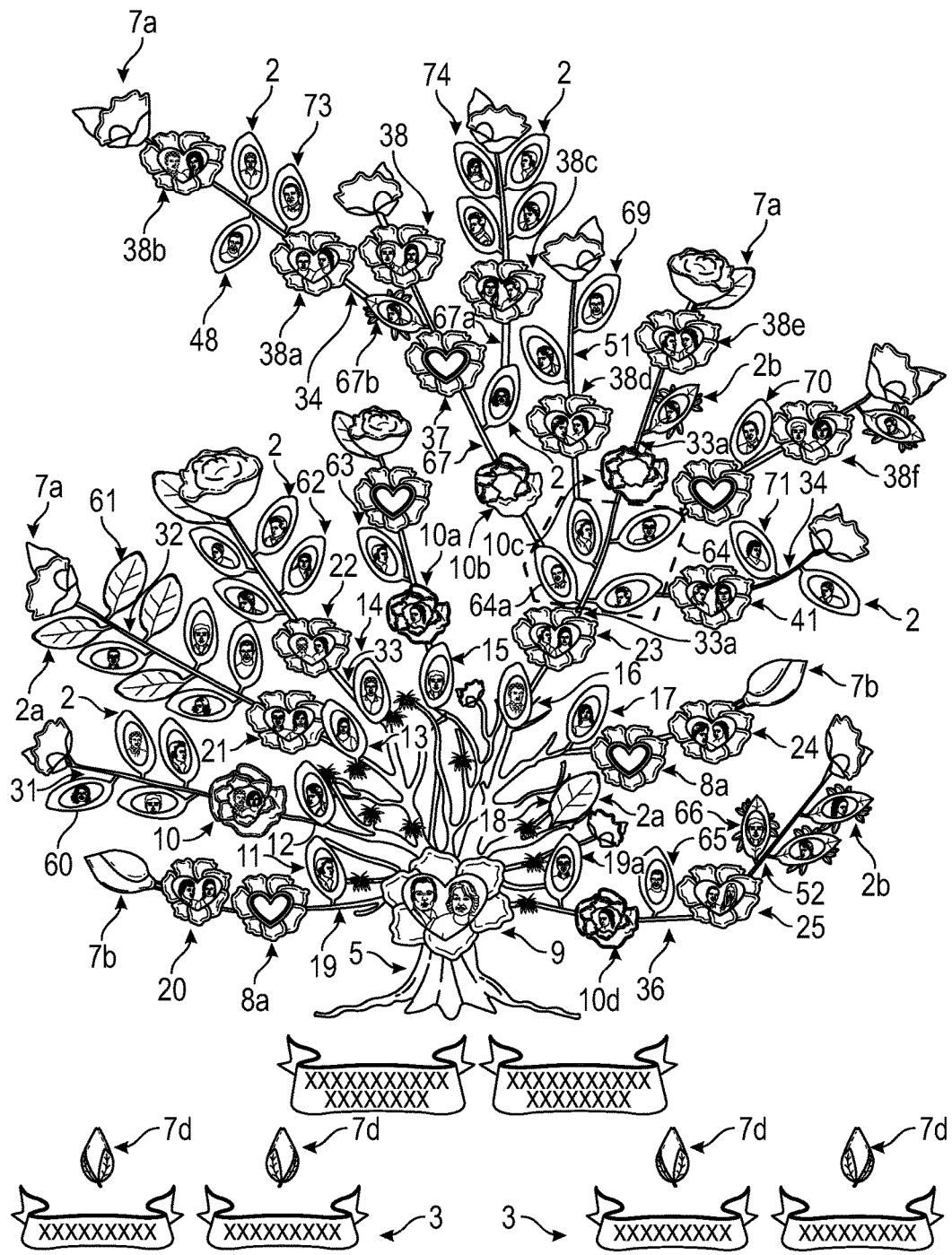
FIG. 1 is an elevation view of the invention as illustratively assembled for a particular family, according to one embodiment of the invention. A Magnolia tree is used as an example herein; therefore, the current invention can be practiced with any tree species and FIG. 1A demonstrates a multi-generational large family tree (Gold and Platinum).

A family tree structure 1, prepared to one embodiment of the current invention is shown illustratively in FIG. 1. The structure 1 includes several kinds of parts: 3 are examples of indicia tags. 7d are examples of seed non-picture frames of the tree. The trunk 5 is a simulation of a tree trunk and crown. Above the root, placed on the trunk 5, is a senior heart-shaped picture frame 9. The structure 1 has some other heart-shaped picture frames 20-25, 37-38, 38a-38f, 41, also called junior hearts and a non-heart frames 8a. The structure 1 has some love-knot picture frames 10 and 10d, as well as, a junior love-knot non-picture frames 10b and 10c. The structure 1 also has some leaf picture frames 2, and leaf non-picture frames 2A. The hearts and leaves are connected to each other and to trunk 5, by some branches 31-34, 36, 51-52. A branch connected directly to the trunk 5, the part of the branch between the trunk and the first leaf shaped picture frames called limbs 19. The user provides their pictures shown in FIGS. 1, 11, 12, 13, 14, 15, and 17.

The various parts of the invention are to be provided as template object pieces in the software, and they are cooperating individual pieces. An important objective of the invention is to provide basic template object pieces for starting on a small scale and permitting expansion later with additional matching template parts. The software, therefore, provides enough template parts for a nuclear family, namely a father, mother, and their direct offspring. One tree trunk, one senior heart-shaped picture frame, and a number of leaf picture frames templates that are sufficient, along with end caps. The components are to be organized according to the actual family relationships of the user's family. In the Photo Family Tree structure, the children photos are displayed from left to right, the oldest to the youngest in chronological order around the crown of a tree.

Figure 1A:
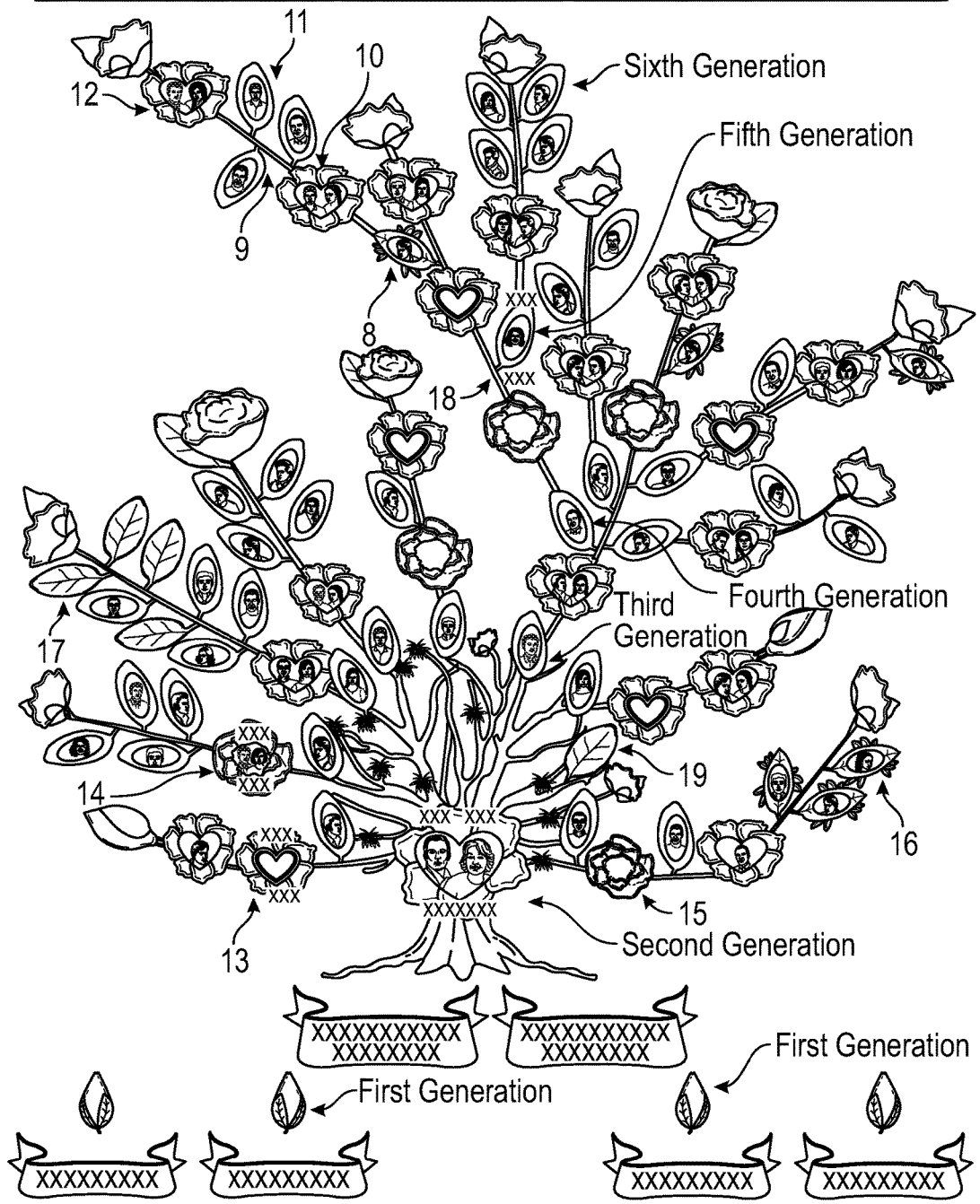

FIG. 1 and FIG. 1A shows an example of the same family tree expanded according to a particular person's extended family. They are identical except, FIG. 1A shows labels for the six generations at a glance; whereas, FIG. 1 is detailed. For clarity, FIG. 1, item numbers 7d pertain to the first generation. Item number 9 represent the second generation. Leaf numbers falling in the range 11-18 and 19a (inclusive) pertain to the third generation; hearts 20-25; love-knots 10,10a and 10d also pertain to the third generation. Hearts 20-25 are pictured with their spouses. Love-knot 10 is pictured with their significant other; while, 10a and 10d are pictured alone. Leaf Item numbers 60-66, pertain to the fourth generation. Leaf Item numbers falling in the range 69-71 relates to the fifth generation while Leaf item numbers 73 and 74 communicates the sixth generation. Leaf Items 2B through 2U are not tied to any one generation, but rather they are auxiliary leaf picture frames and non-picture leaf picture frames used for showing certain relationships, such as a half sibling, adoption, twin, triplets, quadruplets, quintuplets, Stepchild, his child, her child, and our child.) The software also offers them and they are available for use whenever necessary.

1. First Generation

The seed frames of the tree 7d represent the earliest ancestors to be included in the display. Two seed frames stand for the paternal side of the family, and two seed frames signify the maternal side of the family. The parents of the couple featured in 9.

2. Second Generation

The trunk 5 is the structural foundation of the display. A senior heart-shaped picture frame 9, on the tree trunk above the root of the tree, portrays the second generation. Preferably, the senior heart 9; holds an image of husband and wife, the senior couple. The senior heart 9 differs from other hearts. It is larger in size and outer contour.

The user of the invention determines the starting point, whether the first generation is the users grandparent, great-grandparent, or the user (him or herself), et cetera. This decision is influenced by what pictures are available.

3. Third Generation

The children of the senior couple are the third generation of this example FIG. 1. Each member of the third generation is represented by; a leaf picture frame connected directly to the crown of the trunk 5, by a limb 19. Because the third generation is connected directly to the trunk, the branches of these connections resemble the limbs of a tree. Usually, a married member of the third generation; is represented by a heart-shaped picture frame 20-25. If the child never marries, a leaf picture frame 2, or a leaf non-picture frame 2a placed on limb 19 shows an example of that scenario. This person represented by leaf 18, died at age 19, before marriage and did not produce an offspring, so his bloodline ended. Hearts 20 and 24 represented members of the third generation who each married twice but produced no offspring of their own. Also, if the third generation child does not marry, but does produce at least one offspring, a love-knot picture frame depict the third generation family member alone, or with a significant other as shown by love-knots 10,10a and 10d.

Multiple hearts or love-knots, or in combination can appear on a single branch to indicate multiple marriages, illustrated by branch 67, junior hearts 37 and 38; along, with a love-knot 10b to distinguish children born out of wedlock if desired, For example, if a child of the senior couple produced an offspring before marriage, a love-knot picturing the child alone can be used to indicate the start of a new generation as shown by love-knot 10d. Then, this family member later married shown by heart 25. The third generation family member is thus pictured twice but depending on the scenarios; their photo can appear three times like leaf 11, hearts 8a and 20. Also, the individual represented in leaf 12 is not married but has four children represented by four leaves on branch 31. The parent of these four children is represented by a love-knot picture frame 10. As before, it represents the start of a new generation without indicating marriage. Therefore, a love-knot may or may not be a picture frame, as desired by the user. According to the preferred method of practicing the invention, the love-knot substitutes for a heart wherever no marriage exists.

4. Fourth Generation

Hearts, 21, 22, 23 and heart 25 represent third generation family members who married and had children of their own. These children are the fourth generation and represented individually by leaves whether they married or not. The couple pictured in heart 21 had eight children who are represented by the eight leaves on branch 32; four children's pictures in leaf frames and four children's indicated by four leaf non-frames. Persons pictured in heart 22 had four children represented by the leaves on branch 33. Individuals pictured in heart 23 had four children together represented by the leaves on branch 33a. Later the husband died, and the widow had one child out wedlock, leaf 2b before marrying for a second time, heart 38e. The couple pictured in heart 24 had no children, and the couple pictured in heart 25 had three children together, and the leaves on branch 52 represent them. The person represented by 10d had one child leaf 65 before marriage and three children following her wedding, heart 25. The children of heart 25 are fourth generation too.

There are also several examples of nuclear family displays. Nuclear family displays are a two-generation structure having a heart or a love-knot, branch (not necessarily including any limb portion), and one or more leaves, love-knot 10, heart 21 and 10a are nuclear families display examples. The leaves above love-knot 10 and 10a are also a member of the fourth generation.

4. Fifth Generation

On branch 33a, four children of the fourth generation have married and had families of their own. The four leaves represent these individuals, leaf 64 and 64a. The manner in which these marriages and families are represented is an essential contribution to the current version of the invention. It allows the trunk 5, bearing three-generation family tree structure as described so far to expand to any number of generations. (Likewise, it also allows a trunk-less, two-generation nuclear family display to be expanded to any number of generations).

Note that branch 67, (which crosses behind love-knot 10b, heart 37 and 38), is touching or is "grafted" into leaf 64a. Leaf 64a already grows out of branch 33a by its leafstalk, simulation of the way leaves grow in nature. A graft at 64a into a leaf is the appearance of a second branch connected to the leaf directly into the blade instead of via the leaf stalk. According to the invention, the basic nuclear family structure can repeat after a graft 64a. FIG. 1 shows the nuclear family display of love-knot 10b, branch 67, and leaf 64a, branch 67a, and the nuclear family display of heart 37, leaf 67b branch 34 grafted onto the leaf. According to the invention, heart 37 represents the marriage of the individual represented by leaf 64a, branch 33a. This heart 37 and love-knot 10b holds a picture of the marriage couple and unmarried person respectively of leaf 64a. If a couple is pictured or an unmarried person is pictured, then the bloodline descendant of the senior heart member 9, can be pictured four times as in this example Once in leaf 64a; once in 10b if the photo is available; once in heart 37 and once more in heart 38. (If this marriage had resulted in no offspring, the structure would terminate with heart 37. Branch 34 would not extend past the periphery of heart 37 near its inward facing point and the remaining structure originating from this branch 34 would not be there.

Since a union 10b did occur and did produce a child out of wedlock, leaf 2, branch 67; branch 67a extends beyond the periphery of heart 38c on two sides. According to the preferred method of practicing the invention, the love-knot substitutes for a heart wherever no marriage exists. Additionally, the marriage heart 37, did result in another child leaf 67b on branch 34; branch 34; branch 34 extends beyond the periphery of heart 38a, on two sides also. On one side branch 34, is grafted into the spouse's leaf 67b. On the other side, the phyllotaxy of leaves 48, 73 and 2 grow from it. A similar structure is grafted into leaf 2, branch 67a; four leaves directly above heart 38c. Leaves 48, 73 and 2, on branch 34 and four leaves above heart 38c represent the sixth generation.

5. Sixth Generation

Leaves 48, 2, 73 on branch 34 and leaves 74, 2 and the two leaves above heart 38c on branch 67a are representations of the sixth generation family members. The grafted on leaves of branch 34 and 67a show that these two each have families of their own. The two individuals represented by leaves 2 and 67b are married, as represented by heart 38a and 38c: 38a has three children represented by the leaves 48, 73 and 2, on branch 34, and 38c has four children represented by the four leaves on branch 67a directly above heart 38c respectively.

The foregoing illustrates one preferred way several generations can be indicated according to the invention. The heart shape is used to indicate marriage and the structure, or relative positions and connections, make clear who is married to whom. The invention is not restricted to six generations as shown in example. Another generation can be added to an existing leaf by grafting in a second branch. This second branch should have a heart or love-knot followed by one or more leaves of the new generation. A marriage without children can be added by grafting in a second branch and heart. The bloodline ends when a marriage or a union produces no offspring. In that case, an end cap placed at the end of their branch to symbolize truncation of the bloodline.

If parents are likely to have more children in the future; an end cap 7a can be removed from branch 34; for example, and an extra length of a branch can be added above heart 38b to continue the growth of the tree. This facilitates the growth of the family tree structure FIG. 1. Moreover, if family growth requires it, a short branch can be replaced with a longer one. If is known that parents will not have any more children, the tip of the appropriate branch may be terminated with a flower end cap 7a as seen on branches 32 and 33 for example.

Generally, picture frames are used whenever a picture is available. The invention encourages family members to contact one another to obtain photographs. It thus draws families together. Even so, sometimes a photograph is not available from any source. For this reason, the invention provides for a heart-shaped non-frame FIGS. 8a, and 9a; special leaf member 2a; special love-knot members who are not picture frames 10a and 10c. They are identical to the corresponding picture frames except that they have no framed opening for displaying a photograph. Instead, they have a solid front. They are used sparingly to represent actual individuals not pictured, so the unavailability of a picture does not prevent someone from practicing the invention.

The invention also provides some supplementary leaf picture frames: FIGS. 2b, 2d, 2f, 2h, 2j, 2i, 2n, 2p, 2r, and 2t and some leaf non-picture-frames members FIGS. 2c, 2e, 2g, 2i, 2k, 2m, 2o, 2q, 2s, and 2u. These auxiliary leaf picture frames and leaf non-picture frames members are identical to the corresponding picture frames; except, the non-picture frames have no framed opening for displaying a photograph. Their fronts are solid and sparingly used to represent certain individuals and family members like half siblings, adopted, twins, triplets, quadruplet, quintuplet, stepchild, her child, his child, and our child. Again, the unavailability of a picture does not prevent someone from practicing the invention FIG. 1 shows indicia tags 3, shown under seed non picture frames of the tree 7d, the first generation. These tags 3 can bear the family member's name and significant dates such as birth, death, or marriage dates. Also, FIG. 1A shows text option, senior heart, junior heart 13, love-knot 14 and leaf 18 to record family member's name or relevant data across the face of leaves, hearts, and love-knots if desired.

Construction Details of the Preferred Embodiment

The invention is made with a computer software program that provides tree template object pieces that cooperate (connect) in any number of ways. The invention will be further illustrated with details of the most preferred ways it can be constructed; however, the invention's final configuration vary and is determined by the user's family genealogy, and is further illustrated in FIG. 11, FIG. 12, FIG. 13, FIG. 14, FIG. 15 and FIG. 17 for example.

Figure 13:
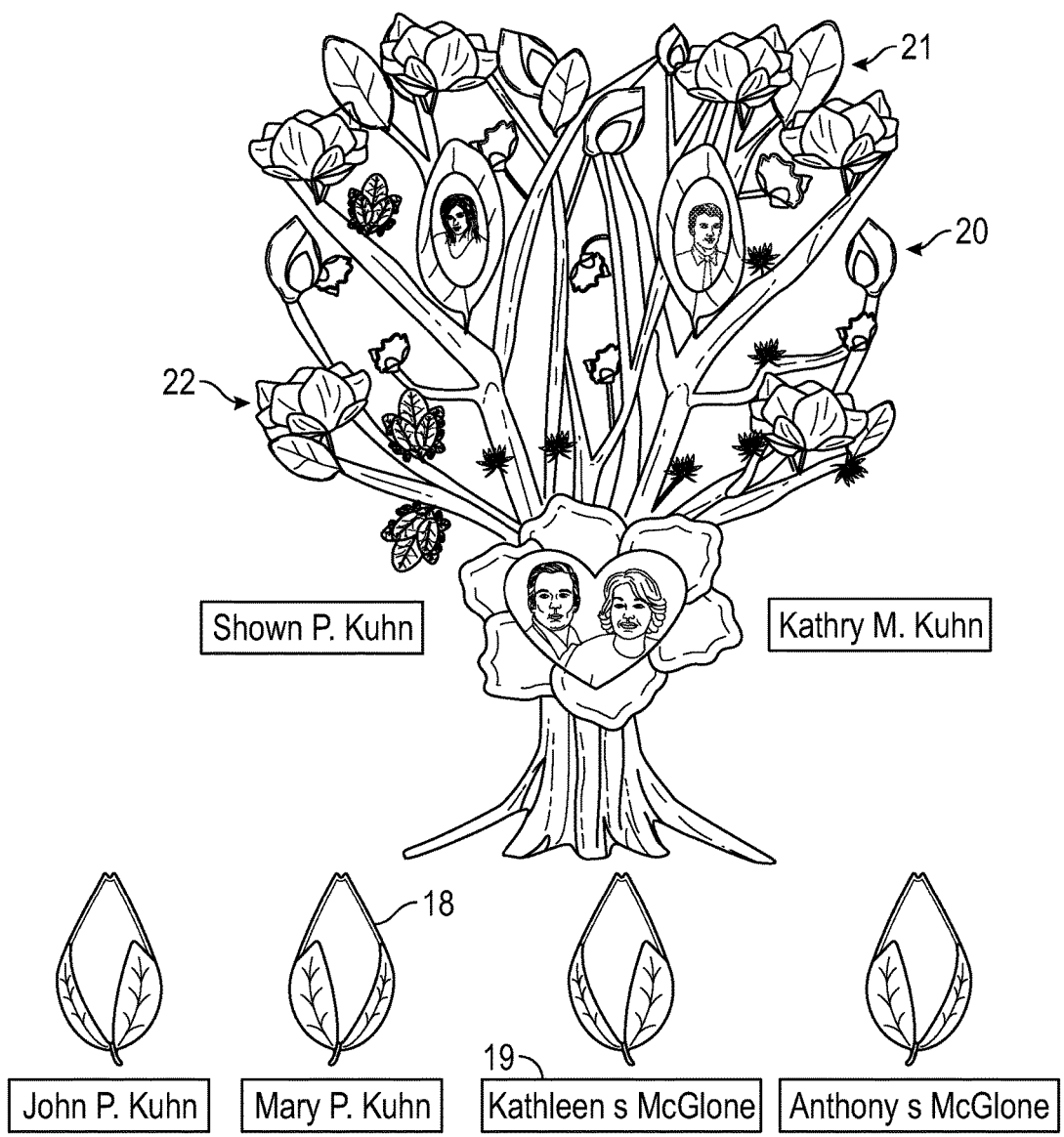
FIG. 13 is medium family tree showing three generations without pictures of the first generation, in the non-seed frames of the tree and the use of indicia tags (Bronze).
Figure 14:
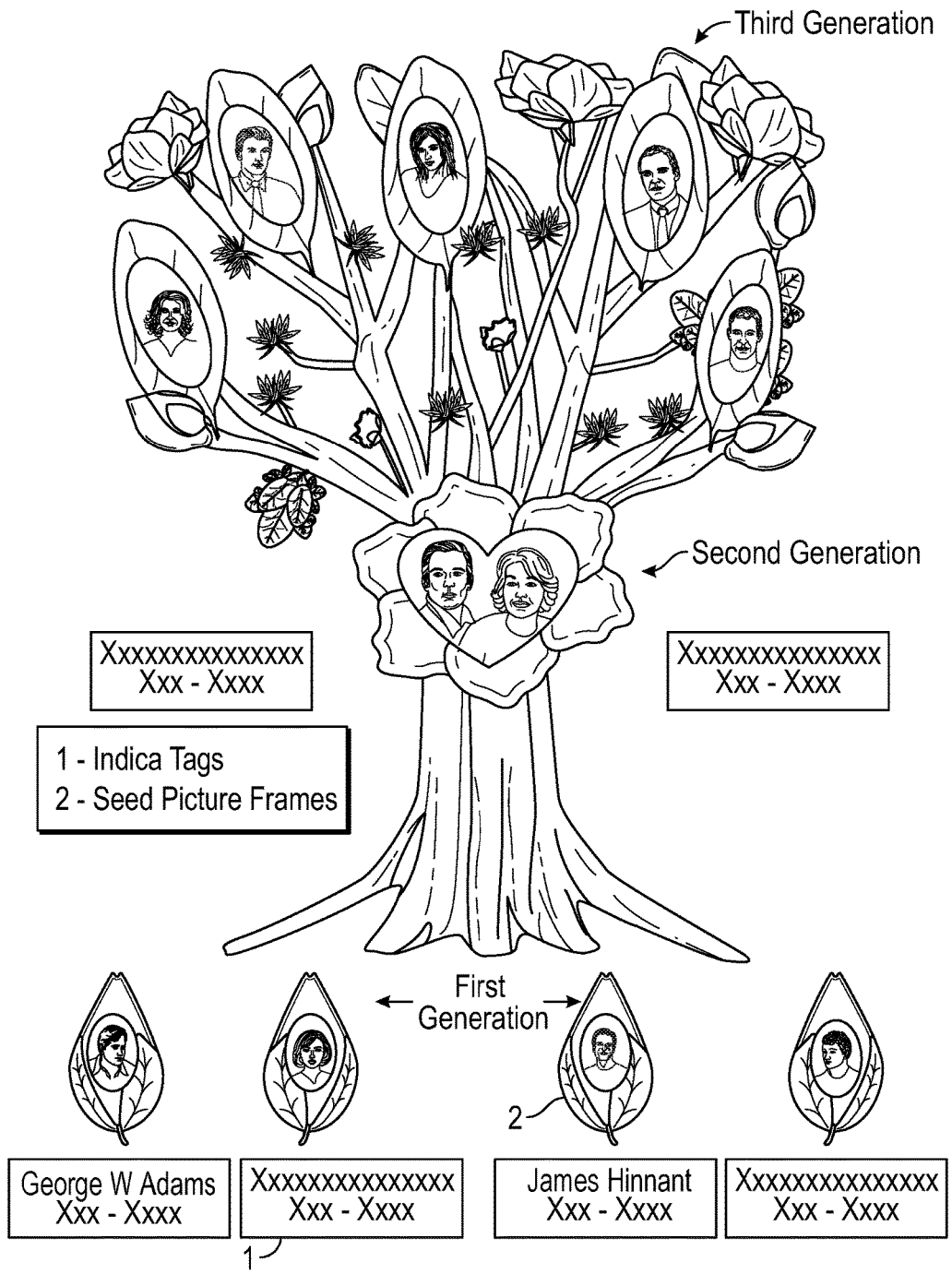
FIG. 14 is a medium family tree showing three generations: photos of the first generations, in the seed frames, below the root of the tree and the use of indicia tags (Bronze).

FIG. 3 is an Indicia Tag used to record names and dates of earliest ancestors identified in the family tree; FIG. 1, FIG. 13 and FIG. 14 shows then in use. All the Figures discussed here are provider to the user as template object pieces within the software application.

Figure 17:
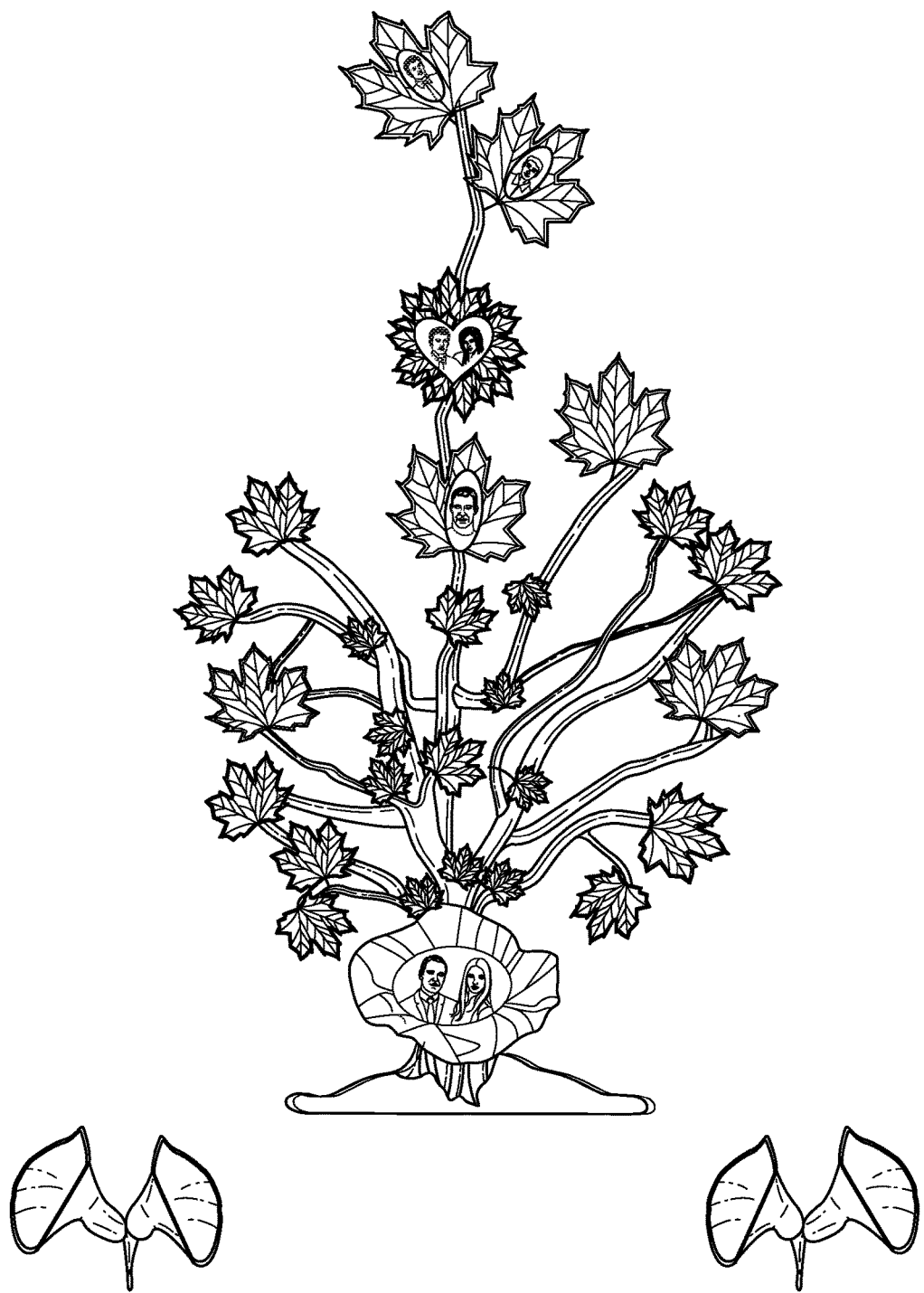
FIG. 17 is an example of a Maple tree and it shows an unmarried couple featured in a senior love-knot who had a child together but never married each other ( ).
Figure 18:
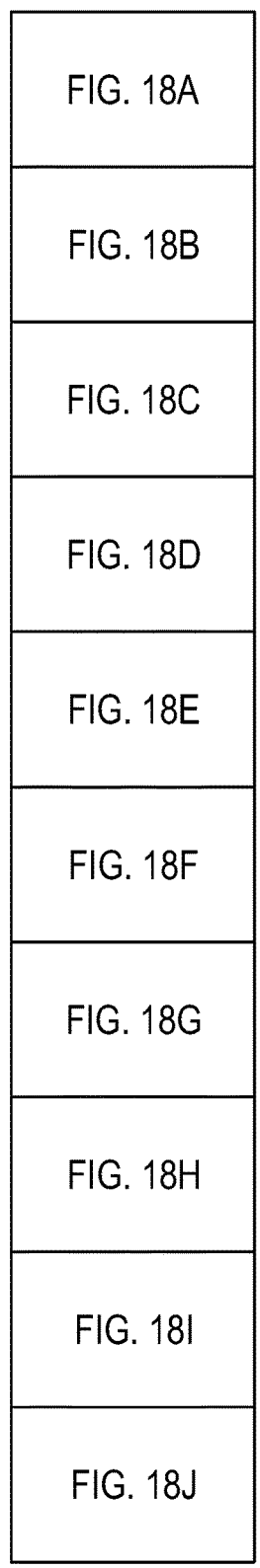
FIG. 18 is a block list pointing out the 10 sections of the flowchart.
Figure 18A:
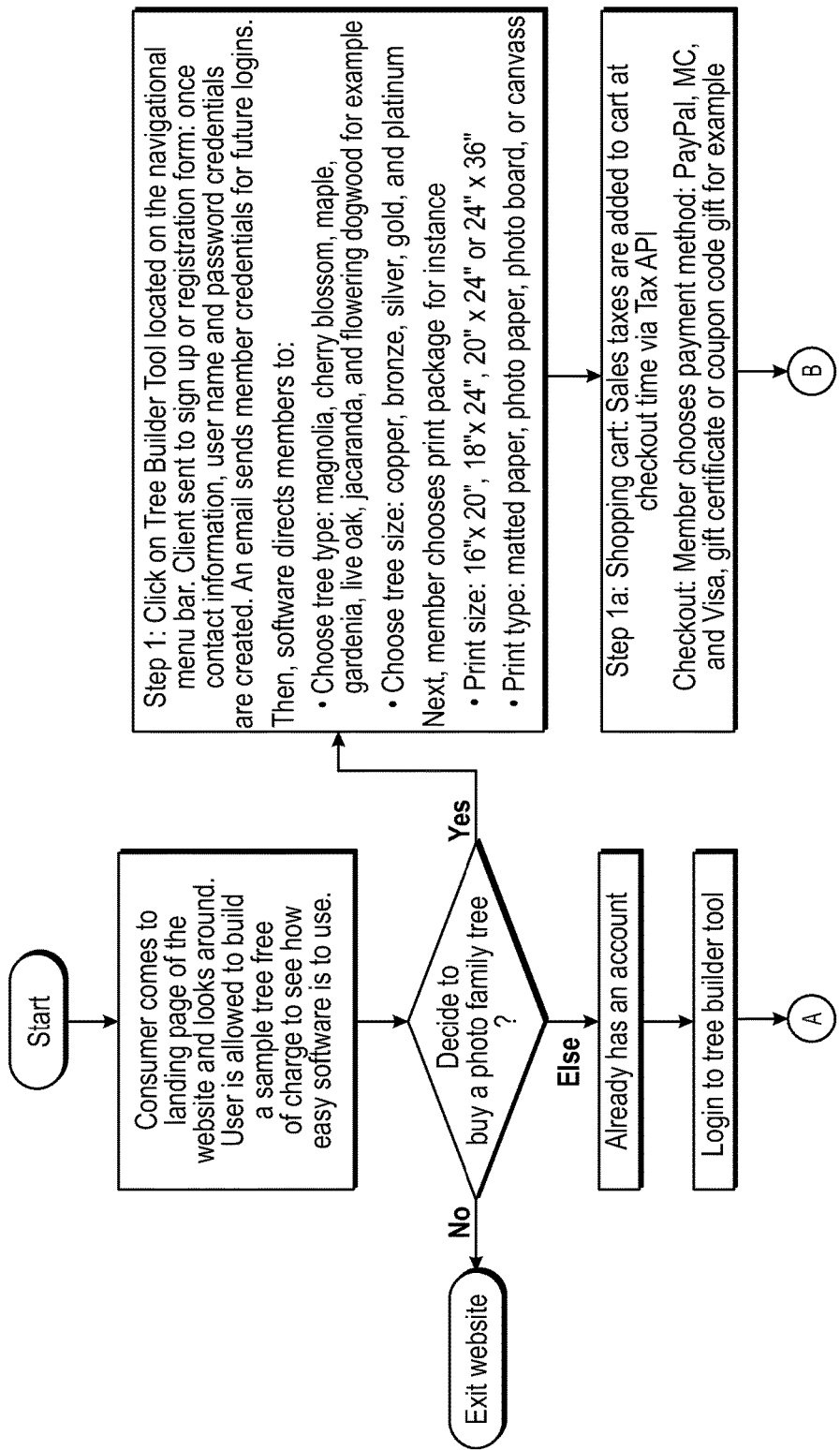
FIG. 18A illustrates the website landing page, sales material, registration login, Step 1, the buying process, Step 1a, the shopping cart and checkout process.
Figure 18B:
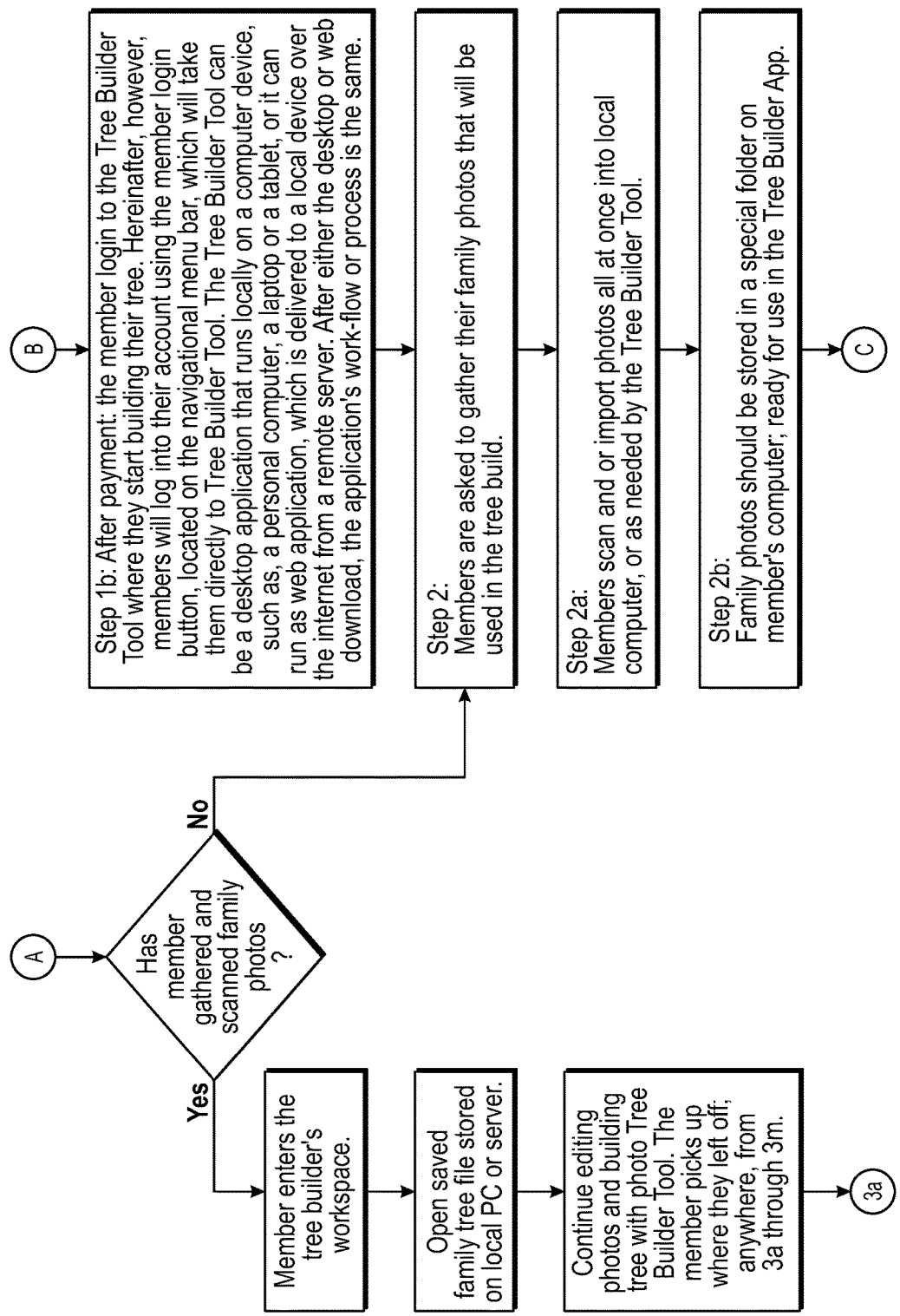
FIG. 18B shows how members login to workspace and retrieve saved family tree, if that is the case and continue editing it; otherwise, Step 1b, user will login and begin the tree building method. Then, member goes to Step 2, Photo gathering, Step 2a, scanning and importing photos that to be used and Step 2b, storing photos folder.
Figure 18C:
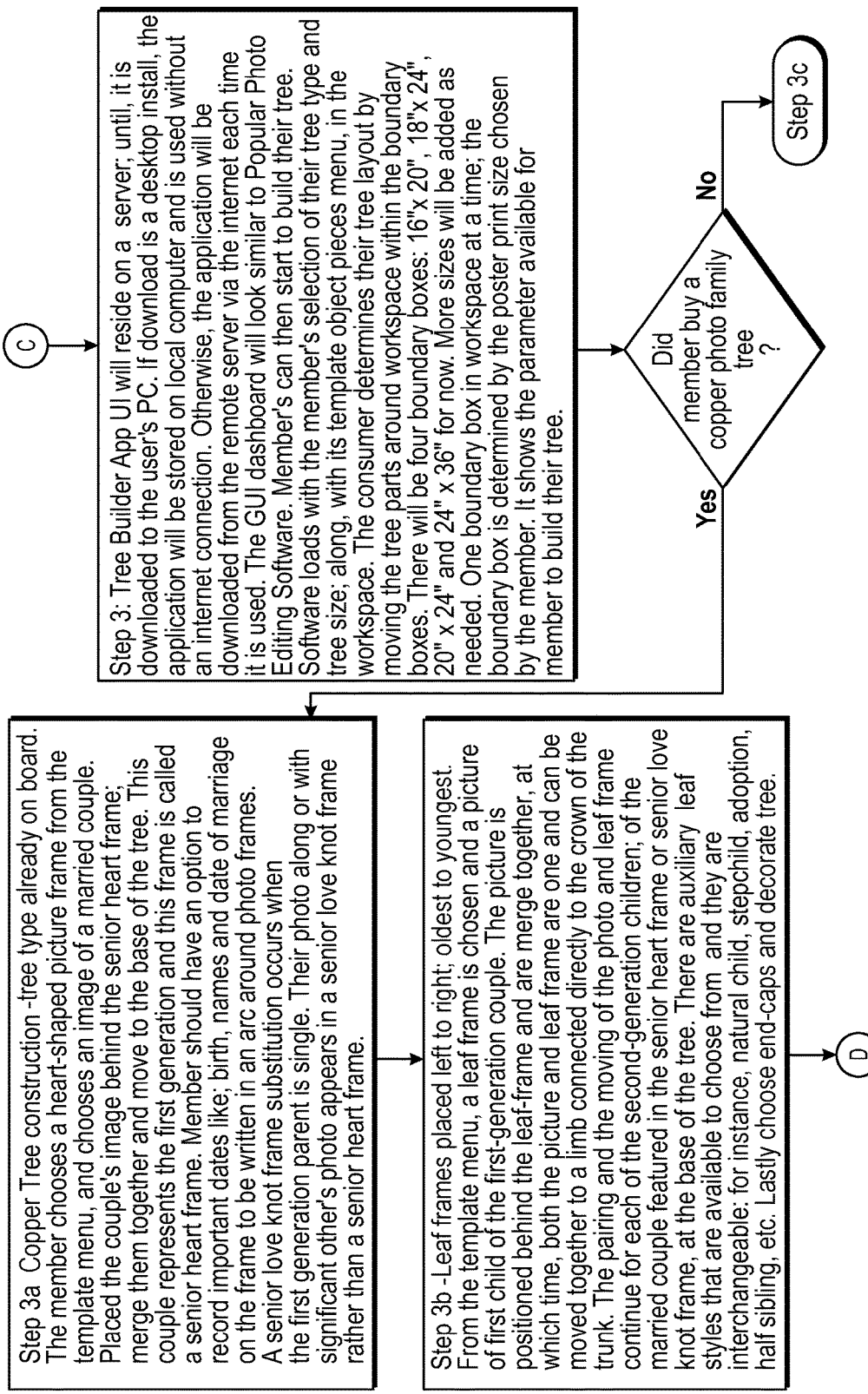
FIG. 18C, Step 3 illustrates the Graphic User Interface dashboard logic. Step 3a through 3b shows the copper tree construction.
Figure 18D:
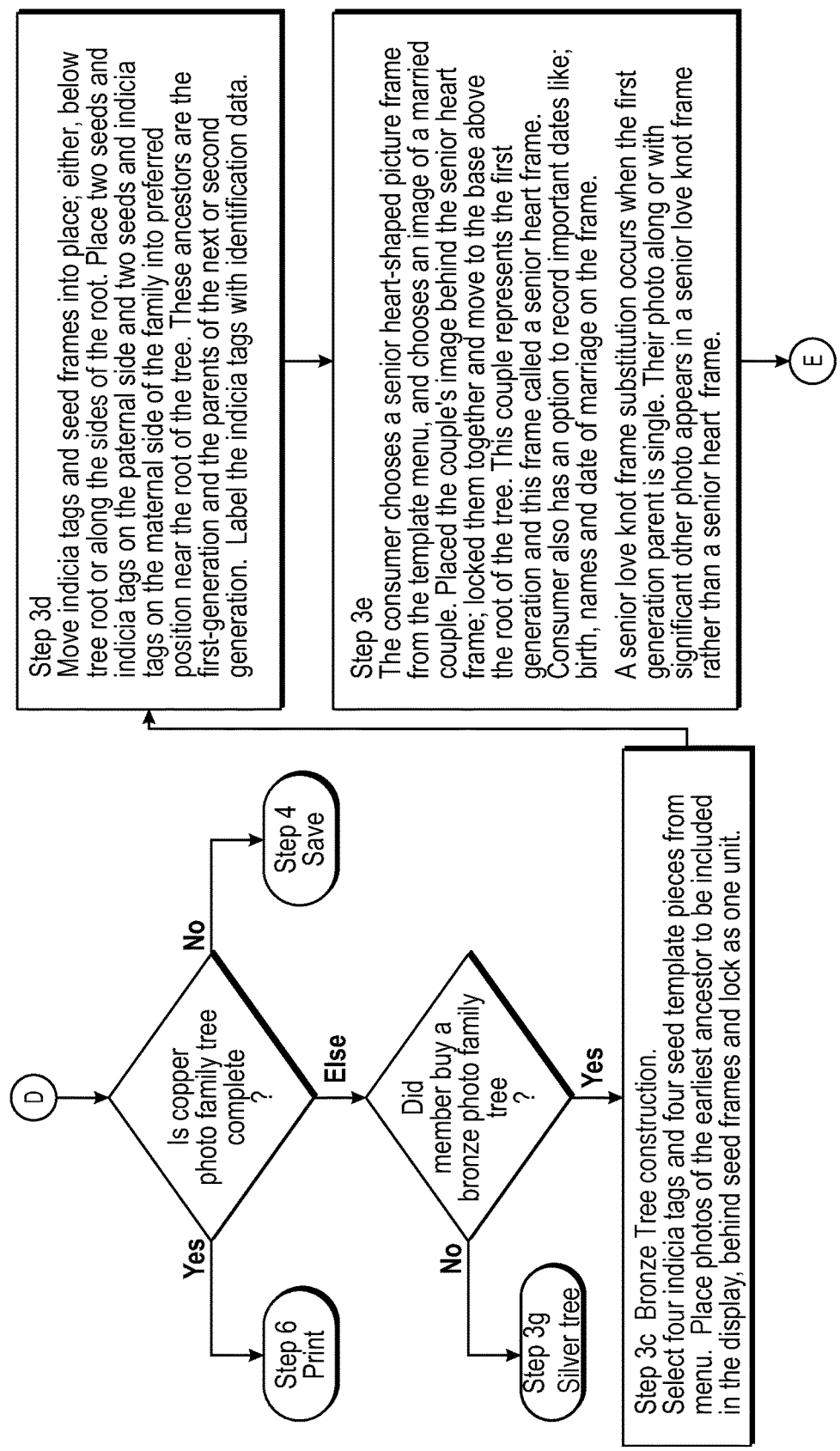
FIG. 18D, Step 3c through 3e shows the bronze tree construction development.
Figure 18E:
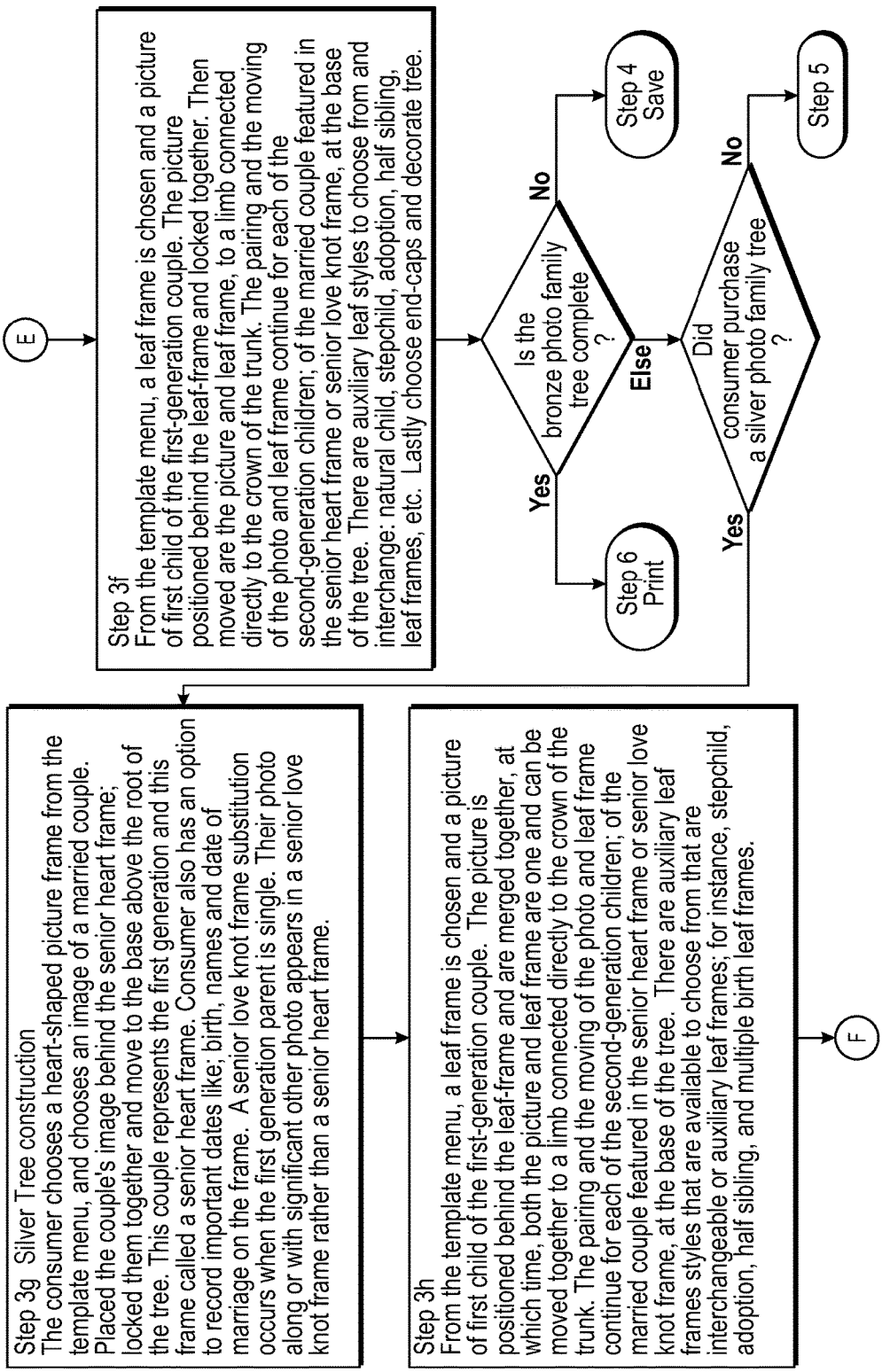
FIG. 18E shows Step 3f through 3h which illustrates the silver tree construction progression.
Figure 18F:
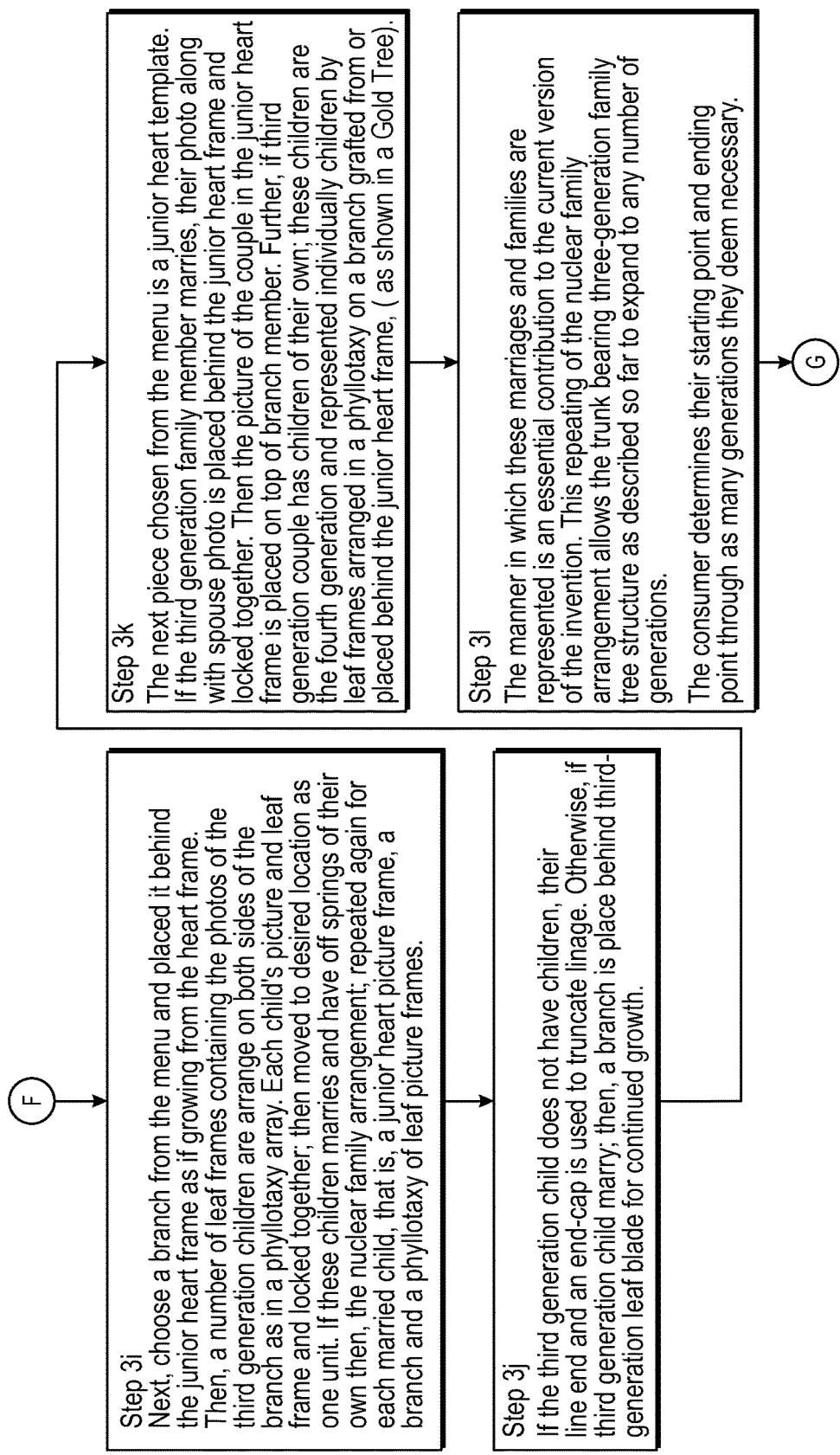
FIG. 18F continues to show silver tree construction sequences with Step 3i through 3l.
Figure 18G:
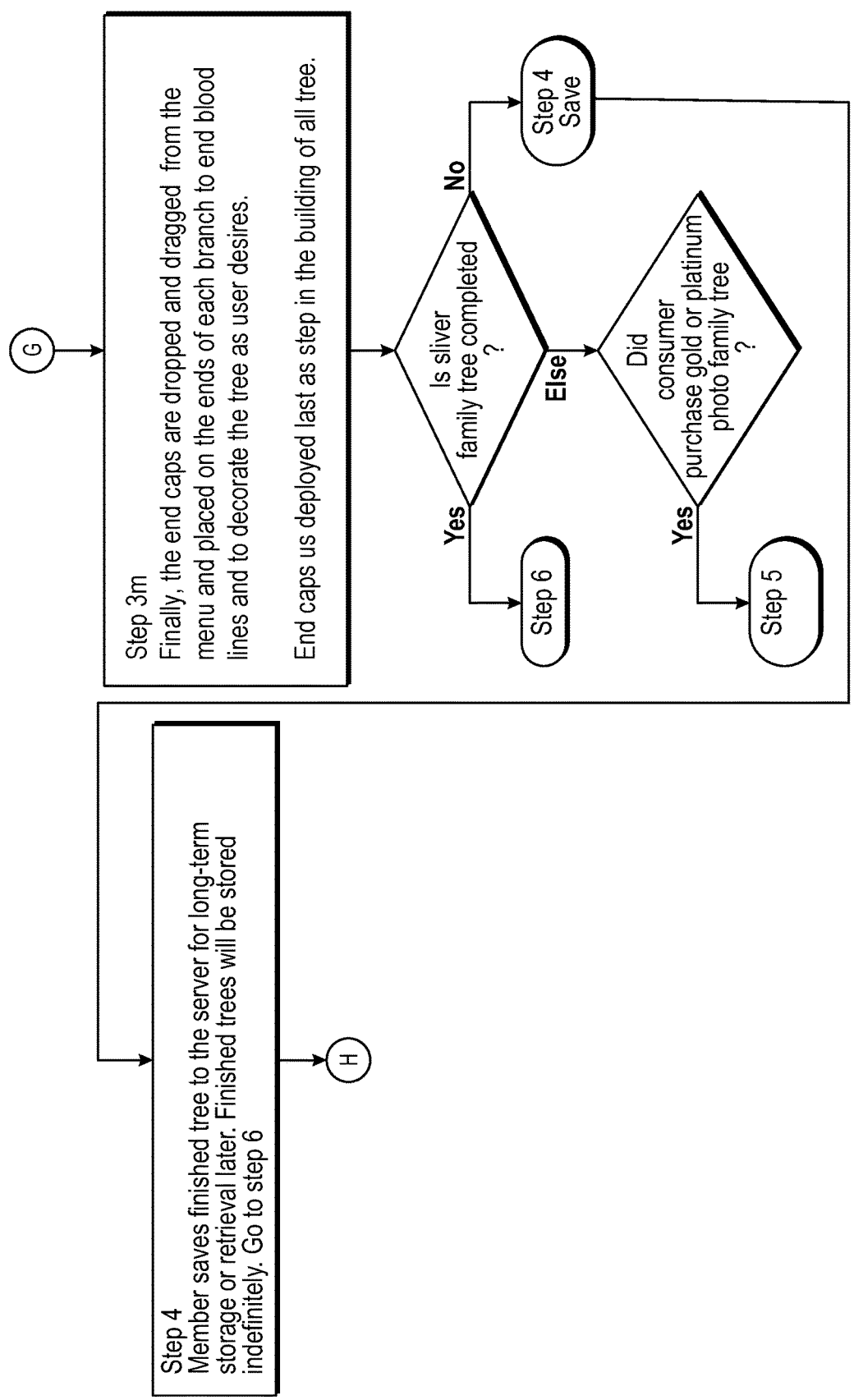
FIG. 18G, Step 3m explains the repeating of the nuclear family arrangement and the tree expanding capabilities. Step 4 expound on long term storage, retrieval of finished family trees.
Figure 18H:
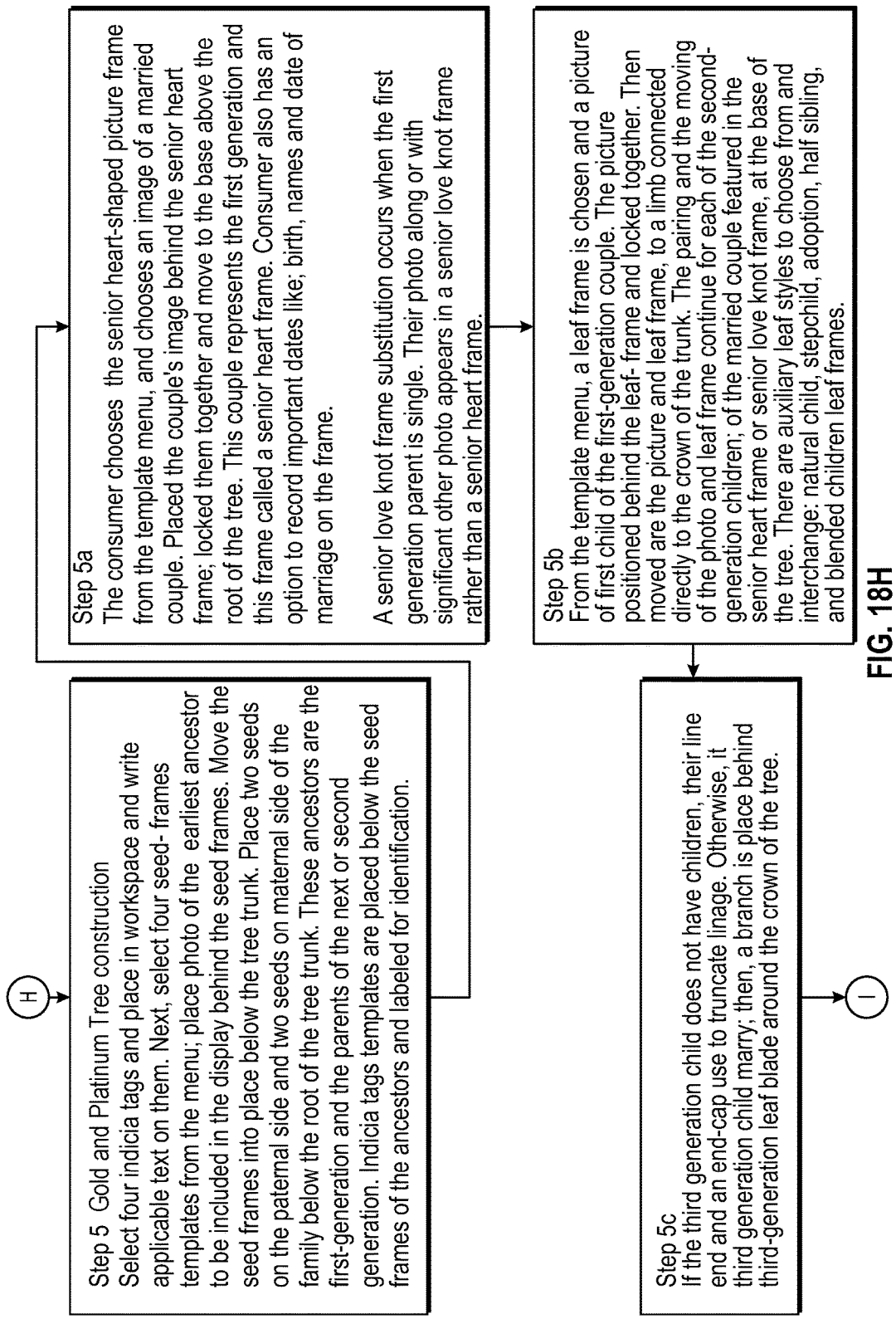
FIG. 18H, Step 5 introduces the indicia tags and seed frames of tree, and the earliest ancestor photo featured in the seed frames and the seed non-picture frames. Step 5a through 5c continues with the construction explanation of the gold and platinum family trees. The only difference between the gold and platinum tree is the platinum is an annual subscription which enables frequent updates to the family tree.
Figure 18I:
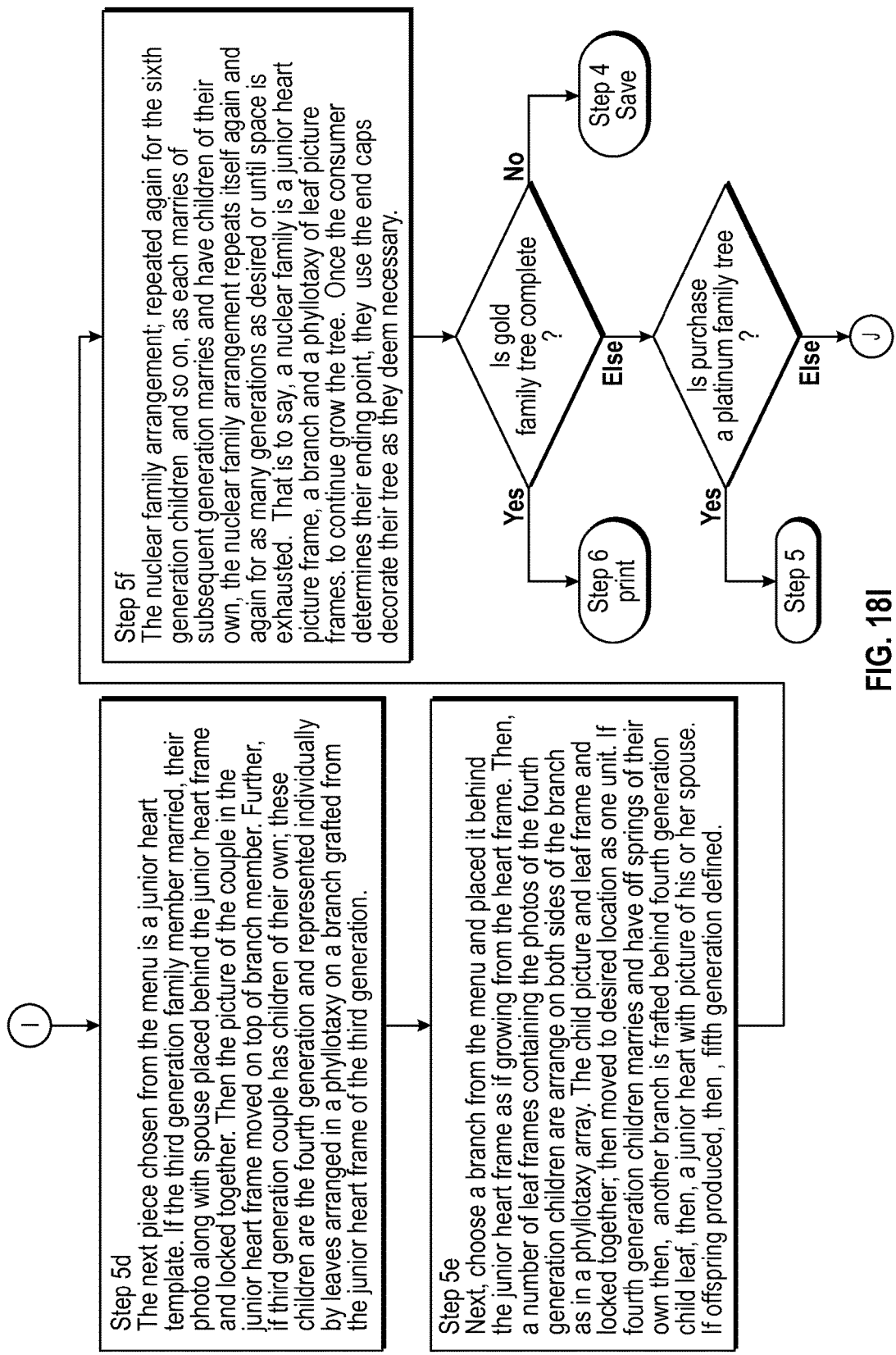
FIG. 18I, illustrates from Step 5d though 5f the continued growth of the gold and platinum family tree and its assembly before printing.
Figure 18J:
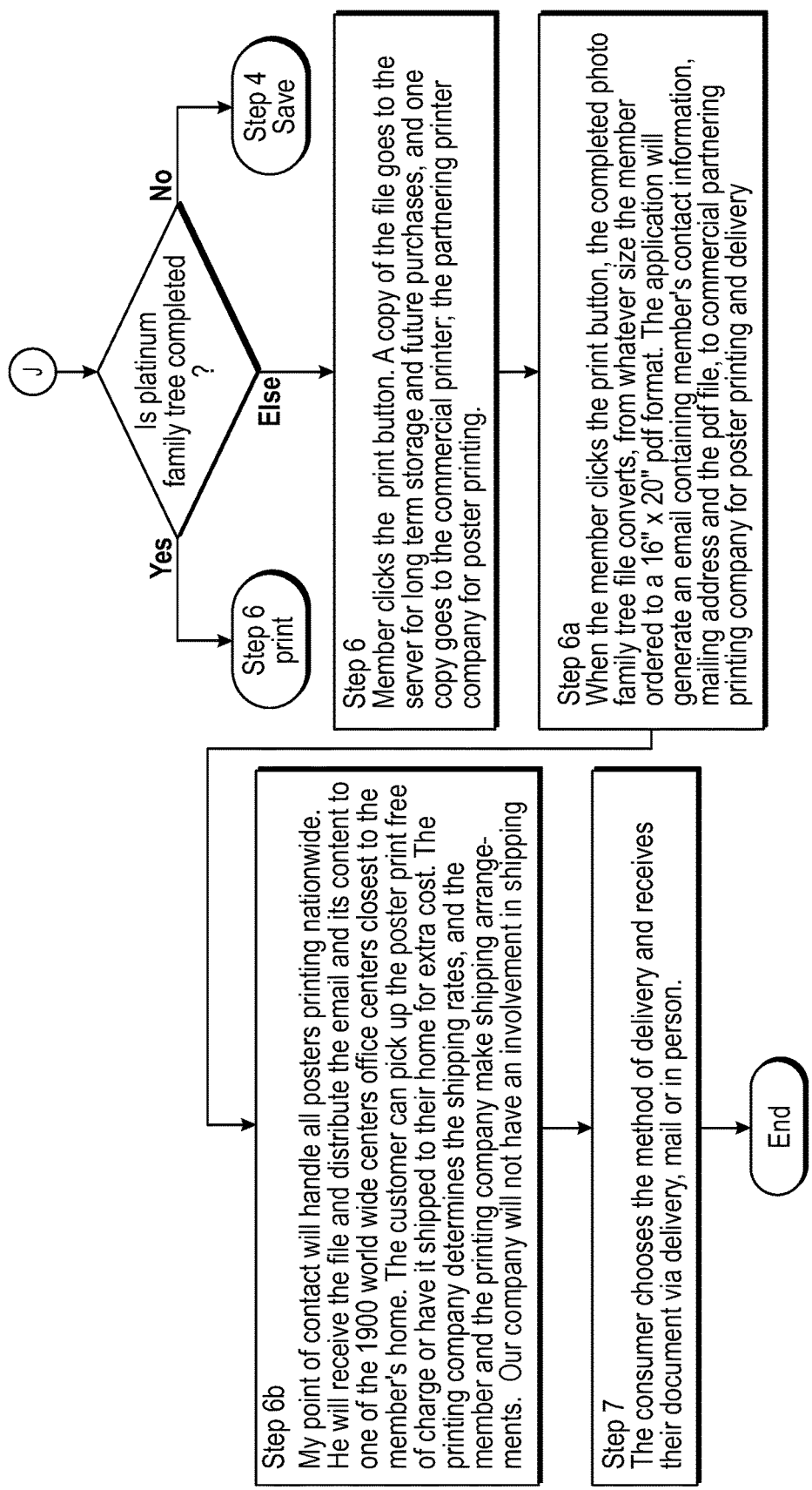
FIG. 18J, Step 6 through Step 7 reveals the poster printing and poster delivery process.

FIGS. 7C and 7D show the seed frame and seed non-frame of a tree. FIG. 7C exhibits the photograph of the earliest ancestor's picture that is available. FIG. 14 the seed frames in use. Whereas, FIG. 7D is the corresponding non-picture seed frame and is used if no picture is available to represent that person. FIGS. 1, 13 and 17 shows non-picture seed frames of different types of trees in use.

FIG. 4 and FIG. 5 are tree trunks. FIG. 4 is an option of a least one tree species and it has a combination of small decorative flowers and leaves in between its branches. FIG. 5 has no decoration. They can be used interchangeably; based on user's preferences. FIGS. 1, 1A, 11, 12, 13, 14, 15 and 16 shows the construction of trunk 4 trunk as examples. Both FIGS. 4 and 5 have limbs that the branches and leaf frames connect to around the crown of the trunk. See in use with FIG. 1A, third generation leaves surrounding the crown.

FIG. 9 is the senior heart picture frame. It is placed on trunk of the tree above the root. FIGS. 1, 1A, 11, 12, 13, 14, 15 and 16 shows the heart FIG. 9 in use. FIG. 9A is the corresponding senior heart non-picture frame and is used when no photo exist of the senior couple. A senior heart-shaped picture frames FIG. 9 and FIG. 9A are enlarged and adapted to being mounted near the root of a trunk instead of on a branch. The senior heart displays a photograph of the senior married couple in the building of the family tree. FIGS. 1, 1A, 11, 12, 13, 14, 15 and 16 shows the senior heart FIG. 9 in use.

FIG. 10B is a senior love-knot picture frame. The love-knot picture frame is structurally similar to a senior heart-shaped picture frame; except, the love-knot peripheral shape distinguishes it from both hearts and leaves. The love-knot has four semicircular lobes. The love-knot symbolizes unmarried persons or unions of unmarried persons. A senior love-knot picture frame FIG. 10B is used on the trunk of the tree above the root, and substitutes for the senior heart FIG. 9; when the union of unmarried persons occurs and an offspring is produced. FIG. 17 shows an example of the senior love-knot in use. The corresponding love-knot non-picture frame FIG. 10C is used when pictures of the senior unmarried couple is not available.

Figure 2:
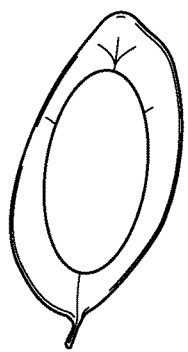
FIG. 2 illustrates a leaf picture frame, a front view of a template object as provided, according to one embodiment of the invention.
Figure 2A:
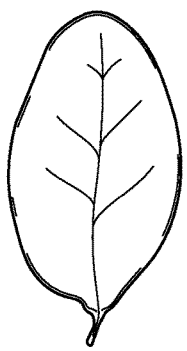
FIG. 2A is a non-picture-frame leaf (a placeholder for missing pictures of an actual person). It can be used as an end cap also.

FIG. 2 shows a leaf frame. A leaf in nature can take on many different shapes. Nevertheless, the identification of a leaf in any form is a leaf. It has a blade portion and a leafstalk portion, by which the blade is attached to a branch. The leaf stalk is also the branch connector which is placed along the branch. FIG. 1A, fourth generation leaf 17 shows leafstalk in use. In other words, the leaf appears to be growing from the branch via its leafstalk. Another distinguishing feature which can identify a group of picture frames as leaves is it that they are arranged in a phyllotaxy. A phyllotaxy is a naturally occurring arrangement of leaves around a branch and nothing grows on the leaves after that. Additionally, one of the unique features of the invention is the construction in which a leaf attaches to two branches. FIG. 1A, the leaf 8, is attached to a first branch 18, by its leafstalk, that would normally nourish a leaf in nature. The leafstalk 8 connection indicates the ancestor side of the leaf. The second branch 9, indicates, the spouse and descendent side of the leaf. It attached to the blade of the leaf 8 as if it were "grafted" in. When this construction is used, the particular location or manner in which the second branch 9 is grafted into the blade 8 is not important. What is important is the fact that the leaf 8 has a leafstalk that "naturally" connected to a first branch 18 and an "extra" branch 9, and it is clearly visible which is which. Preferably, the second branch 9 is constrained to touch or placed behind the blade of 8, but to practice the invention it is enough for the second branch 9 to be attached to the leaf 8 in any manner that clearly distinguishes it from the leafstalk of 8. In any case the second branch 9 extends beyond the periphery of leaf 8. FIG. 2A is the corresponding leaf non-picture frame used when a picture is not available, FIG. 1A, leaf 19. In contrast, the heart-shaped picture frames all have peripheral shape of a heart symbol as shown herein and commonly seen on Valentine's Day. Neither the heart nor love-knots have leafstalks.

Figure 2B:
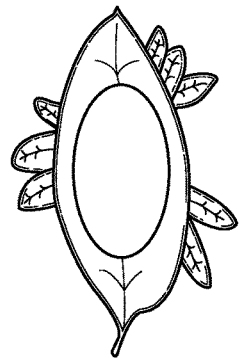
FIG. 2B shows a half sibling leaf frame.
Figure 2C:
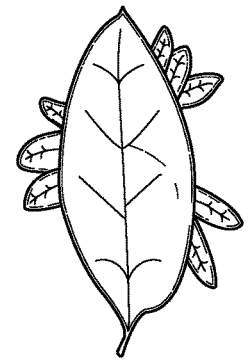
FIG. 2C demonstrates a half sibling leaf non-picture frame.
Figure 2D:
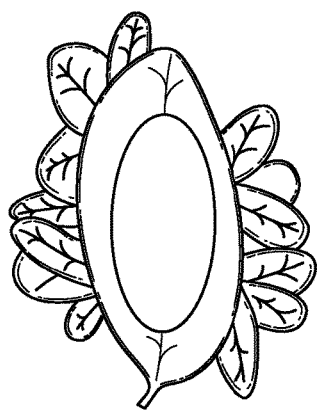
FIG. 2D shows an adopted leaf picture frame.
Figure 2E:
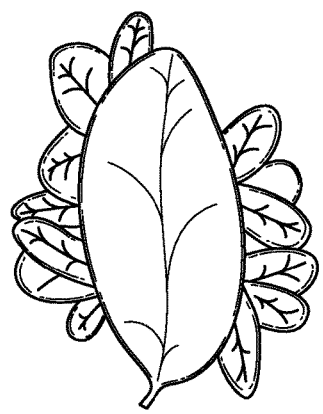
FIG. 2E illustrates an adopted leaf non-picture frame.
Figure 2F:
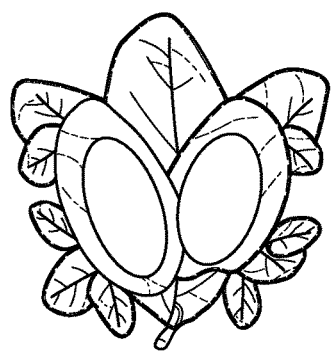
FIG. 2F shows a twin leaf picture frame.
Figure 2G:
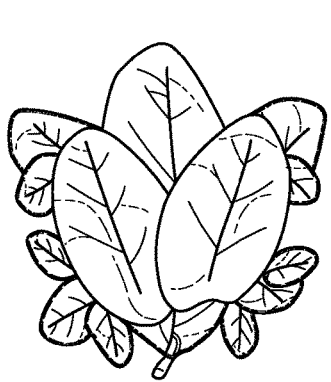
FIG. 2G shows a twin leaf non-picture frame.
Figure 2H:
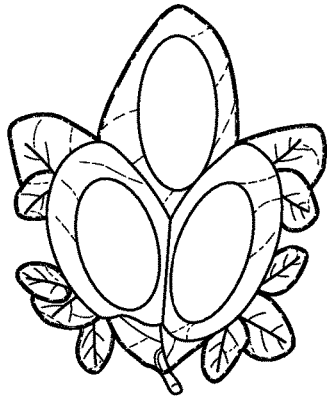
FIG. 2H illustrates a triplet leaf picture frame.
Figure 2I:
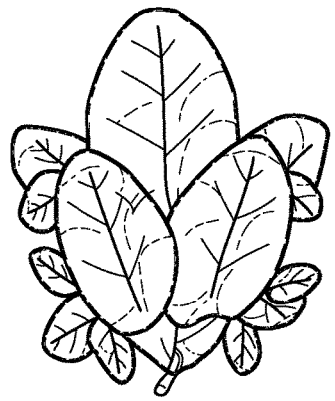
FIG. 2I shows a triplet leaf non-picture frame

FIGS. 2B through 2U are auxiliary leaf picture frames and leaf non-picture frames. They are interchangeable with FIG. 2 and FIG. 2A when necessary. If for instance, an offspring is a half sibling; then, FIG. 2B is used in instead of FIG. 2. FIG. 1A shows half sibling leaf 8. Persons represented by leaf 18 and leaf 8 are half siblings for they have the same mother, but different fathers. When an offspring is an adopted child; then, FIG. 2D picture frame is used in place of FIG. 2. If offspring are multiple births, such as twins, triplet, Quadruplet, and Quintuplet; then, leaf picture frames: FIGS. 2F, 2H, 2J, and 2I are used respectively as an alternative for FIG. 2. In the case of blended families and there are offspring from previous marriages or relationships, the offspring can be identified if desired by using the: stepchild leaf picture frame FIG. 2N, her child leaf frame 2P, our child leaf frame FIG. 2R and his child leaf frame FIG. 2T in the place of FIG. 2. The corresponding leaf non picture frames are: FIGS. 2C, 2E, 2G, 2F, 2K, 2M, 2O, 2Q, 2S, and 2U in that order and are not shown herein.

FIG. 6 shows a sample long branch and FIG. 7 shows a sample curve branch. All branches can have leaf frames attached to it on either side, as in a phyllotaxy. See in use, FIG. 1A, leaf pictures frames attached to branch 9. The branches, contrary to nature, attached themselves to the leaf blades. The heart-shaped picture frames and love-knot picture frames mount themselves to branches also. Again, neither the hearts nor love-knots have leafstalks.

Figure 11:
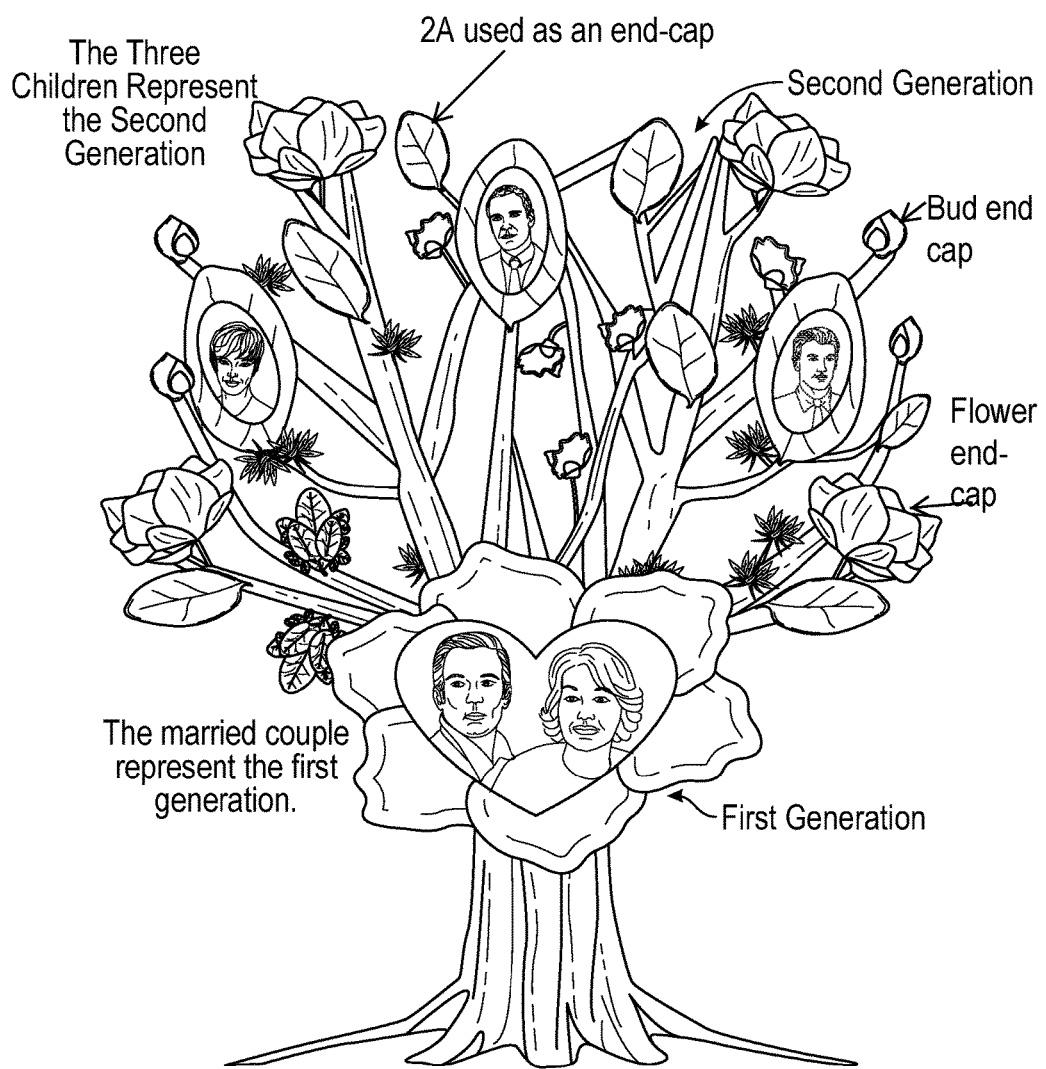
FIG. 11 is a small nuclear family tree (copper).
Figure 12:
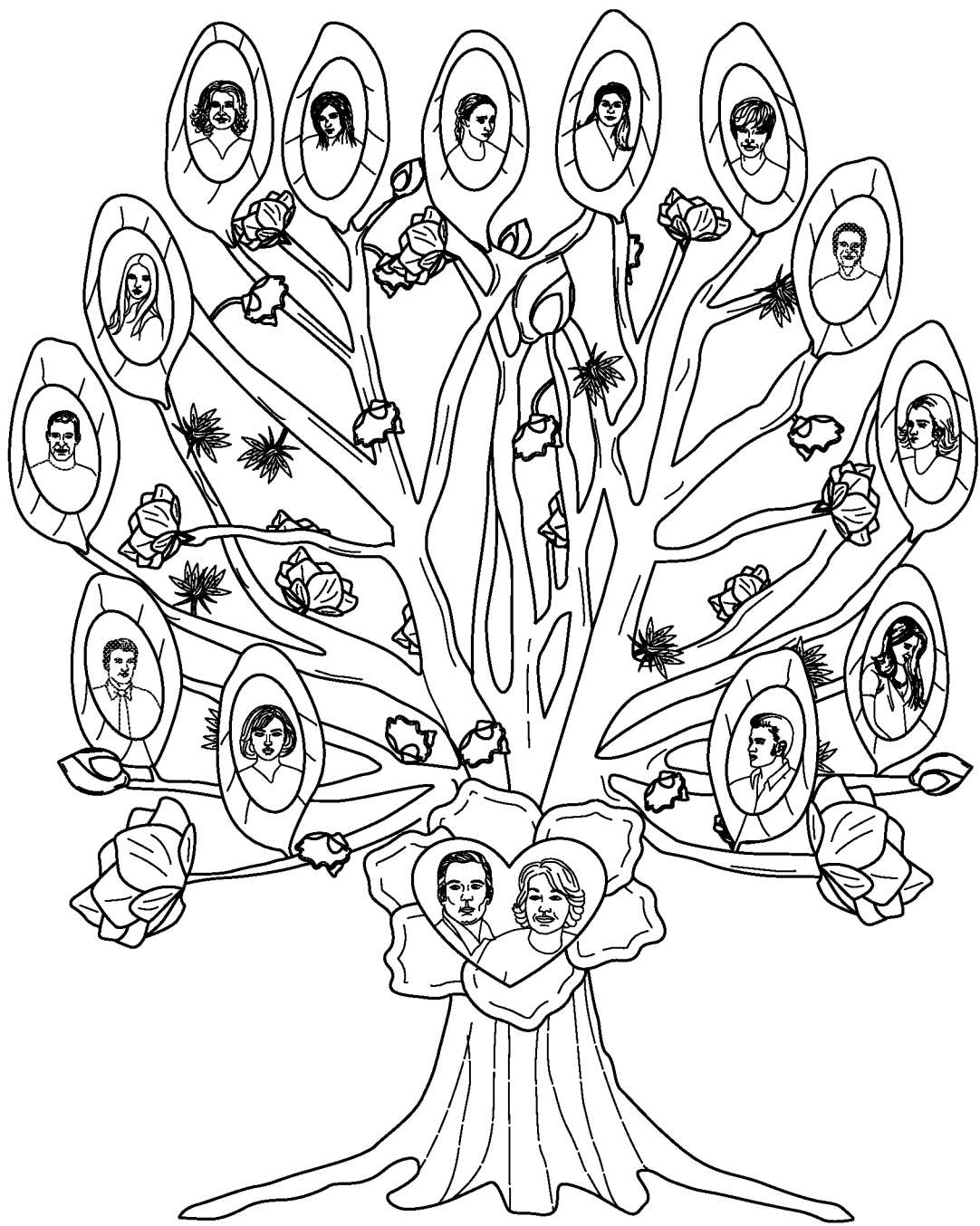
FIG. 12 is a large nuclear family tree (copper).
Figure 15:
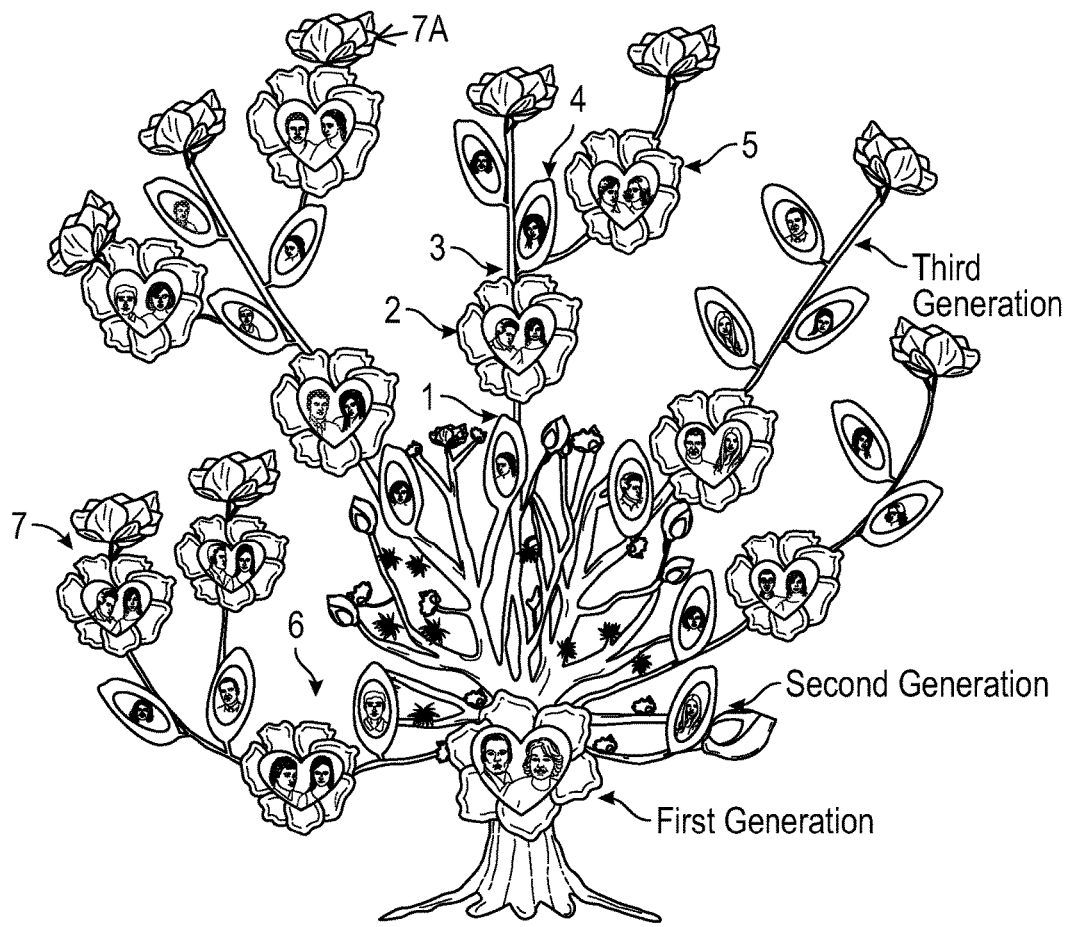
FIG. 15 is a medium family tree also showing three generations, senior couple (mom and dad), their children, and grandchildren (Silver).
Figure 16:
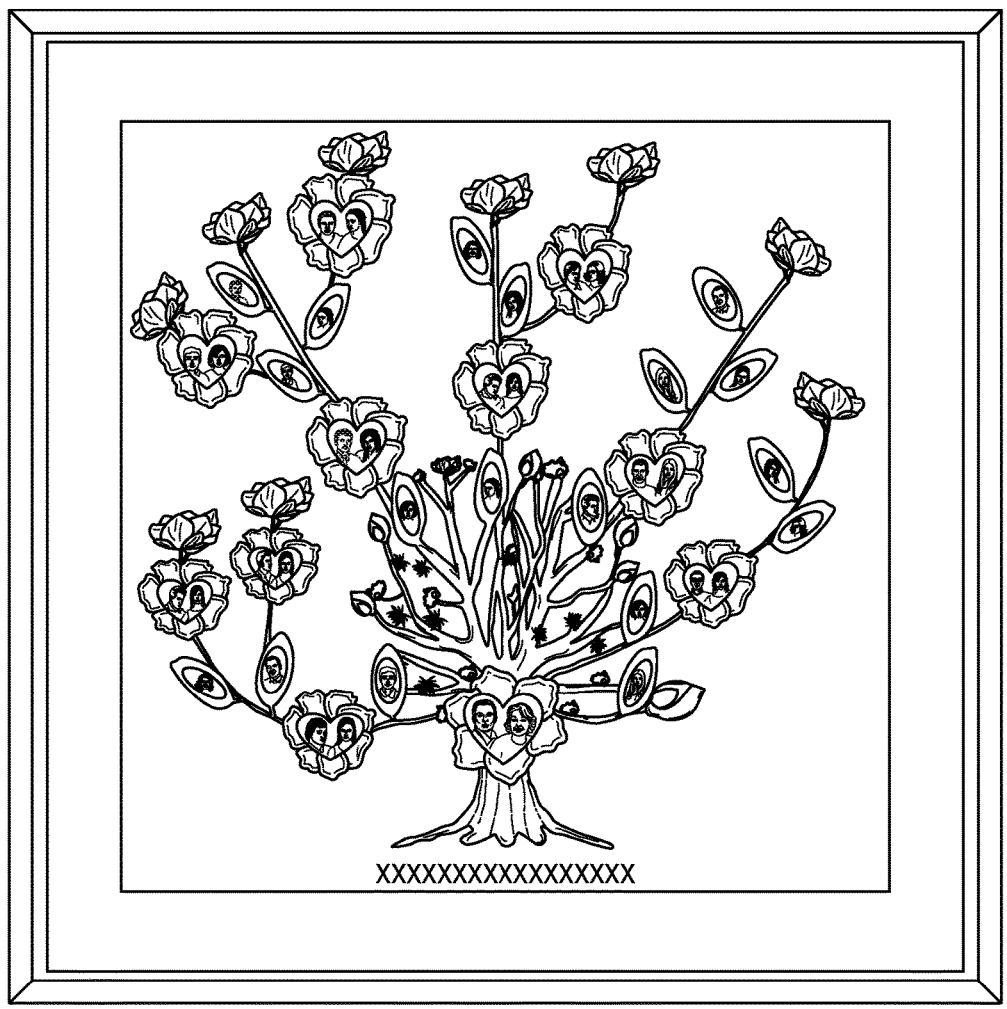
FIG. 16 illustrates a professionally framed elevation view of a family tree (Silver), an arrangement made possible by the current invention.

FIG. 7A is a flower end cap and FIG. 7B is a bud end cap. Both are used to show termination of a bloodline and they doubles as decoration on the tree. User can sometimes use the leaf non-picture frame FIG. 2A as an end-cap also by attaching leaf to the tip or end of the branch as decoration. FIG. 11 shows FIGS. 2A, 7A flower end cap, and 7B bud end cap in use as decoration, and FIG. 15 shows the flower caps 7A are used as blood line terminations and decorations.

FIG. 8 illustrates the junior heart-shaped picture frame while FIG. 8A shows the junior heart non-picture frame. The junior heart picture frames are constructed like the leaf except for its peripheral shape and the absence of a leafstalk FIG. 2. The absence if a leafstalk's inherent branch connector providing for a "naturally" connected first branch. Instead, a junior heart FIG. 8 and FIG. 8A is attached to a single branch 18 as shown in 1A. The size of the junior hearts FIG. 8 and FIG. 8A are smaller than the senior heart FIG. 9 and FIG. 9A, and the shapes are a little different from each other, but they mount the same, in that, FIG. 9 and FIG. 9A is mounted on a tree trunk 5 while FIG. 8 and FIG. 8A is mounted on a branch.

FIG. 10 show the junior love-knot picture frame. FIG. 10A is the corresponding junior love-knot non-picture frame. They are structurally similar to heart-shaped picture frames FIGS. 8 and 8A, and FIG. 9A; except the peripheral shape of the love-knots distinguishes them from both the hearts and leaves. The love-knots FIGS. 10 and 10A have four semicircular lobes, and it attaches to a single branch as seen in FIG. 1A, love-knot 14 and 15.

FIG. 10B illustrates the senior love-knot. It attaches to the tree trunk FIG. 5 and used as a substitution for heart FIG. 9; in the case of an unmarried senior couple. Again, FIG. 17 shows the senior love-knot FIG. 10B in use for an example. FIG. 10C is the corresponding senior love-knot non picture frame and used when photographs are not available.

No matter the kind of tree species the Photo Family Tree Builder imitate, all parts of the invention should match in style and size to establish the appearance of a unified structure. Picture frames should match in approximate picture area, except where a large size serves a purpose as previously disclosed. Picture frames of the same kind should match in all border characteristics including peripheral shape. Picture frames of different kinds should match in all border characteristics other than peripheral shape. Such characteristics include the border of the frames, color, and thickness, width between the picture and periphery, and design, if any. The love-knot picture frame is a partial exception in that its border is wider at its four lobes. Nevertheless it can still be made to appear harmonious with the other parts by what they have in common, such as frame width where the lobes meet.

The pictures used can be any likeness of the individuals they represent, whether actual photographs, photocopies of the same or whatever. Photographs can be enlarged or reduced to fit the appropriate frame size and shape. Users determine the orientation that each picture frame takes, so each likeness is either right side up or has a desirable tilt. The orientation of each picture frame does not have to be planned out in advance, but rather picture frames and branches can be adjusted as desired.

The entire Photo Family Tree's construction is made with a computer program, and once the completed composition has satisfied the consumer's taste. He or she hits the print button, and the whole file is sent to a commercial printing company to be printed as a poster. The user chooses the tree type, paper package, and poster size; at the beginning of the process, as well as, chooses to receive the poster either mounted or unmounted. If the poster is unmounted, the customer can have the Photo Family Tree professionally framed as featured in FIG. 16 and hang it on a wall to display. After the poster has been printed; the customer can either personally pick up the poster from the commercial printer, or have it delivered.

I claim:

1. An electronic family tree building tool in a computing device, a method for customizing a photo family tree, the method comprising:
    displaying a graphical user interface (GUI) on a display device associated with the computing device, the GUI providing a plurality of selectable tree species from which to build the photo family tree;
    displaying a simulated tree with a tree trunk and a tree crown associated with a selected tree species, the simulated tree being displayed to emulate the selected tree species and including a defined phyllotaxy;
    providing a plurality of selectable tree species template objects to selectively arrange individually each selected one template object on the tree crown to customize growth of the photo family tree, wherein the selectable tree species template objects are arranged according to phyllotaxy based on interactions by a user, the plurality of selectable tree species template objects includes:
        at least one branch associated with the tree species, said at least one branch comprising an elongated simulated branch member configured to extend growth of the simulated tree; and
        a plurality of picture frames having a plurality of styles corresponding to a plurality of possible relationships and generations, wherein each picture frame including an area for selective placement of a respective picture of one or more family members, the plurality of picture frames includes:
            tree flower picture frames for display of married family members of a nuclear family;
            tree leaf picture frames for display of an individual child in a nuclear family;
            a plurality of leaves picture frames, each leaf of the plurality of leaves includes an area for placement of a respective one sibling in the nuclear family, wherein a number of leaves of the plurality of leaves corresponds to a number of siblings born having a same birth date;
            end caps indicating the end of a person's lineage;
    receiving a one or more selections of the plurality of selectable tree species template objects;
    importing one or more photographs, wherein the photographs are selected from the group consisting of: photographs of married couples and photographs of an individual person;
    receiving one or more selections of picture frames and orientations of each picture frame;
    associating each of the selected picture frames with one of the imported photographs;
    receiving, from the user, a selection of a placement of branches for the one or more selected picture frames;
    grafting the select one or more of the plurality of user-selectable tree species template objects according to the phyllotaxy based on the user selected placement of branches and each of the one or more selected picture frames of the plurality of picture frames wherein the selected one or more user-selectable tree species template objects is assembled into any one of a number of configurations through generational arrangement of the user-added pictures frames interconnected with the simulated tree and the branches;
    displaying the simulated tree and the selected one or more user-selectable tree species template objects including the selected branches and picture frames as added by the user; and
    transmitting the displayed electronic family tree to a third party for printing.

2. The method of claim 1, wherein the crown includes a plurality of crown branches; and further comprising:
    receiving placement of a selected first picture frame having an area for displaying a first-generation family member picture on the trunk to place the first-generation family member picture at a location on the trunk; and
    subsequently receiving placement on a respective one crown branch a selected second picture frame having an area for displaying a second-generation family member picture of a second-generation family member related to the first-generation family member.

3. The method of claim 2, wherein the first-generation family member comprises a plurality of second-generation family members; and further comprising:
for each additional remaining second-generation family member of the plurality of second-generation family members, repeating the subsequently receiving placement step wherein the subsequently receiving placement is associated with a different crown branch for each different second-generation family member.

4. The method of claim 3, wherein at least one second-generation family member comprises at least one third-generation family member; and further comprising:
for each crown branch to include a corresponding second-generation family member, grafting the elongated simulated branch member of a selected one branch at a selected location along a length of the respective one crown branch to grow the tree according to phyllotaxy; and
receiving placement on a user-selected location of the elongated simulated branch member associated with the crown branch of the corresponding one second-generation family member a selected different picture frame having an area for displaying a third-generation family member picture related to a corresponding one second-generation family member.

5. The method of claim 1, wherein the plurality of selectable tree species template objects further includes:
branch end caps associated with the tree species for ending growth of a respective one branch; and further comprising:
receiving placement of a selected branch end cap at an end of one of a selected one crown branch or the grafted elongated branch member to simulate end of growth.

6. The method of claim 1, wherein the crown includes a plurality of crown branches and roots; and the plurality of selectable tree species template objects further includes at least one of a name field, a seed picture frame; and further comprising:
receiving placement at a location below the roots the seed picture frame having an area for displaying a first-generation family member picture below the roots; and
subsequently receiving placement on the trunk a selected first picture frame having an area for displaying a second-generation family member picture of a second-generation family member related to the first-generation family member; and
subsequently receiving placement on a respective one crown branch a selected second picture frame having an area for displaying a third-generation family member picture of a third-generation family member related to the second-generation family member.

7. A system comprising:
a computing device;
a display device coupled to the computer;
an electronic family tree building tool in the computing device configured to:
display a graphical user interface (GUI) on a display device associated with the computing device, the GUI providing a plurality of selectable tree species from which to build the photo family tree;
display a simulated tree with a tree trunk and a tree crown associated with a selected tree species, the simulated tree being displayed to emulate the selected tree species and including a defined phyllotaxy;
provide a plurality of selectable tree species template objects to selectively arrange individually each selected one template object on the tree crown to customize growth of the photo family tree, wherein the selectable tree species template objects are arranged according to phyllotaxy, the plurality of selectable tree species template objects includes:
at least one branch associated with the tree species, said at least one branch comprising an elongated simulated branch member configured to extend growth of the simulated tree; and
a plurality of picture frames having a plurality of styles corresponding to a plurality of possible relationships and generations, wherein each picture frame including an area for selective placement of a respective picture of one or more family members, the plurality of picture frames includes:
tree flower picture frames for display of married family members of a nuclear family;
tree leaf picture frames for display of an individual child in a nuclear family;
a plurality of leaves picture frames, each leaf of the plurality of leaves includes an area for placement of a respective one sibling in the nuclear family, wherein a number of leaves of the plurality of leaves corresponds to a number of siblings born having a same birth date;
end caps indicating the end of a person's lineage;
receive a one or more selections of the plurality of selectable tree species template objects;
import one or more photographs, wherein the photographs are selected from the group consisting of: photographs of married couples and photographs of an individual person;
receive one or more selections of picture frames and orientations of each picture frame:
associate each of the selected picture frames with one of the imported photographs;
receive, from the user, a selection of a placement of branches for the one or more selected picture frames;
graft the select one or more of the plurality of user-selectable tree species template objects according to the phyllotaxy based on the user selected placement of branches and each of the one or more selected picture frames of the plurality of picture frames wherein the selected one or more user-selectable tree species template objects is assembled into any one of a number of configurations through generational arrangement of the user-added pictures frames interconnected with the simulated tree and the branches;
display the simulated tree and the selected one or more user-selectable tree species template objects including the selected branches and picture frames as added by the user; and
transmit the displayed electronic family tree to a third party for printing.

8. The system of claim 7, wherein the crown includes a plurality of crown branches; and the electronic family tree building tool in the computing device further configured to:
receive placement of the selected first picture frame having an area for displaying a first-generation family member picture on the trunk to place the first-generation family member picture at a location on the trunk; and
subsequently receive placement on a respective one crown branch a selected second picture frame having an area for displaying a second-generation family member picture of a second-generation family member related to the first-generation family member.

9. The system of claim 8, wherein the first-generation family member comprises a plurality of second-generation family members; and the electronic family tree building tool in the computing device further configured to:
for each additional remaining second-generation family member of the plurality of second-generation family members, repeat the subsequently receive placement wherein the subsequently receive placement is associated with a different crown branch for each different second-generation family member.

10. The system of claim 9, wherein at least one second-generation family member comprises at least one third-generation family member; and the electronic family tree building tool in the computing device further configured to:
for each crown branch with a corresponding second-generation family member,
graft the elongated simulated branch member of a selected one branch at a selected location along a length of the respective one crown branch to grow the tree according to phyllotaxy; and
receive placement on a user-selected location of the elongated simulated branch member associated with the crown branch of the corresponding one second-generation family member a selected different picture frame having an area for displaying a third-generation family member picture related to a corresponding one second-generation family member.

11. The system of claim 7, wherein the plurality of selectable tree species template objects further includes:
branch end caps associated with the tree species for ending growth of a respective one branch;
the electronic family tree building tool in the computing device further configured to:
receive placement of a selected branch end cap at an end of one of a selected one crown branch or the grafted elongated branch member to simulate end of growth.

12. The system of claim 7, wherein the crown includes a plurality of crown branches and roots; and the plurality of selectable tree species template objects further includes at least one of a name field, a seed picture frame; and the electronic family tree building tool in the computing device further configured to:
receive placement at a location below the roots the seed picture frame having an area for displaying a first-generation family member picture below the roots;
subsequently receive placement on the trunk a selected first picture frame having an area for displaying a second-generation family member picture of a second-generation family member related to the first-generation family member; and
subsequently receive placement on a respective one crown branch a selected second picture frame having an area for displaying a third-generation family member picture of a third-generation family member related to the second-generation family member.

13. A tangible, non-transitory computer readable medium having instructions stored thereon which when executed by a computing device causes the computing device to:
display a graphical user interface (GUI) on a display device associated with the computing device, the GUI providing a plurality of selectable tree species from which to build the photo family tree;
display a simulated tree with a tree trunk and a tree crown associated with a selected tree species, the simulated tree being displayed to emulate the selected tree species and including a defined phyllotaxy;
provide a plurality of selectable tree species template objects to selectively arrange individually each selected one template object on the tree crown to customize growth of the photo family tree, wherein the selectable tree species template objects are arranged according to phyllotaxy, the plurality of selectable tree species template objects includes:
at least one branch associated with the tree species, said at least one branch comprising an elongated simulated branch member configured to extend growth of the simulated tree; and
a plurality of picture frames having a plurality of styles corresponding to a plurality of possible relationships and generations, wherein each picture frame including an area for selective placement of a respective picture of one or more family members, the plurality of picture frames includes:
tree flower picture frames for display of married family members of a nuclear family;
tree leaf picture frames for display of an individual child in a nuclear family;
a plurality of leaves picture frames, each leaf of the plurality of leaves includes an area for placement of a respective one sibling in the nuclear family, wherein a number of leaves of the plurality of leaves corresponds to a number of siblings born having a same birth date;
end caps indicating the end of a person's lineage;
receive a one or more selections of the plurality of selectable tree species template objects;
import one or more photographs, wherein the photographs are selected from the group consisting of: photographs of married couples and photographs of an individual person;
receive one or more selections of picture frames and orientations of each picture frame:
associate each of the selected picture frames with one of the imported photographs;
receive, from the user, a selection of a placement of branches for the one or more selected picture frames;
graft the select one or more of the plurality of user-selectable tree species template objects according to the phyllotaxy based on the user selected placement of branches and each of the one or more selected picture frames of the plurality of picture frames wherein the selected one or more user-selectable tree species template objects is assembled into any one of a number of configurations through generational arrangement of the user-added pictures frames interconnected with the simulated tree and the branches;
display the simulated tree and the selected one or more user-selectable tree species template objects including the selected branches and picture frames as added by the user; and
transmit the displayed electronic family tree to a third party for printing.

14. The computer readable medium, of claim 13, wherein the crown includes a plurality of crown branches; and the instructions further including instructions which when executed cause the computing device to:
receive placement of the selected first picture frame having an area for displaying a first-generation family member picture on the trunk to place the first-generation family member picture at a location on the trunk; and subsequently receive placement on a respective one crown branch a selected second picture frame having an area for displaying a second-generation family member picture of a second-generation family member related to the first-generation family member.

15. The computer readable medium of claim 14, wherein the first-generation family member comprises a plurality of second-generation family members; and the instructions further including instructions which when executed cause the computing device to:
   for each additional remaining second-generation family member of the plurality of second-generation family members, repeat the subsequently receive placement wherein the subsequently receive placement is associated with a different crown branch for each, different second-generation family member.

16. The computer readable medium of claim 15, wherein at least one second-generation family member comprises at least one third-generation family member; and the instructions further including instructions which when executed cause the computing device to:
   for each crown branch with a corresponding second-generation family member,
   graft the elongated simulated branch member of a selected one branch at a selected location along a length of the respective one crown branch to grow the tree according to phyllotaxy; and
   receive placement on a user-selected location of the elongated simulated branch member associated with the crown branch of the corresponding one second-generation family member a selected different picture frame having an area for displaying a third-generation family member picture related to a corresponding one second-generation family member.

17. The computer readable medium of claim 13, wherein the plurality of selectable tree species template objects further includes:
   branch end caps associated with the tree species for ending growth of a respective one branch;
   the instructions further including instructions which when executed cause the computing device to:
      receive placement of a selected branch end cap at an end of one of a selected one crown branch or the grafted elongated branch member to simulate end of growth.

18. The computer readable medium of claim 13, wherein the crown includes a plurality of crown branches and roots; and the plurality of selectable tree species template objects further includes at least one of a name field, a seed picture frame; and
   the instructions further including instructions which when executed cause the computing device to:
      receive placement at a location below the roots the seed picture frame having an area for displaying a first-generation family member picture below the roots; and
      subsequently receive placement on the trunk a selected first picture frame having an area for displaying a second-generation family member picture of a second-generation family member related to the first-generation family member; and
      subsequently receive placement on a respective one crown branch a selected second picture frame having an area for displaying a third-generation family member picture of a third-generation family member related to the second-generation family member.

* * * * *